United States Patent
Sheldon et al.

(10) Patent No.: US 9,417,829 B2
(45) Date of Patent: Aug. 16, 2016

(54) PRODUCTION PLANNING AND MONITORING IN INKJET DEVICES

(71) Applicant: ELECTRONICS FOR IMAGING, INC., Foster City, CA (US)

(72) Inventors: Maureen Ann Sheldon, Etna, NH (US); Mario Kuehn, Duisburg, DE (US); Daniel Francis Unzen, Center Barnstead, NH (US); Aditya Subhash Sumant, Bangalore (IN); Ranjith Ramachandran, Bangalore (IN); Rohit Kumar Gangwar, Pittsburgh, PA (US); Santhosh Malligere Hulugegowda, Bangalore (IN)

(73) Assignee: Electronics for Imaging, Inc., Fremont, CA (US)

( * ) Notice: Subject to any disclaimer, the term of this patent is extended or adjusted under 35 U.S.C. 154(b) by 0 days.

(21) Appl. No.: 13/756,351

(22) Filed: Jan. 31, 2013

(65) Prior Publication Data
US 2014/0085665 A1 Mar. 27, 2014

Related U.S. Application Data

(60) Provisional application No. 61/706,040, filed on Sep. 26, 2012.

(51) Int. Cl.
*G06F 3/12* (2006.01)
*G06Q 10/06* (2012.01)

(52) U.S. Cl.
CPC .............. *G06F 3/126* (2013.01); *G06F 3/1204* (2013.01); *G06F 3/1205* (2013.01); *G06F 3/1275* (2013.01); *G06F 3/1282* (2013.01); *G06Q 10/0631* (2013.01)

(58) Field of Classification Search
CPC ........................................................ G06F 3/126
USPC ................................................ 358/1.13–1.18
See application file for complete search history.

(56) References Cited

U.S. PATENT DOCUMENTS

| | | | |
|---|---|---|---|
| 7,248,578 B2 | 7/2007 | Lumley et al. | |
| 2003/0107772 A1* | 6/2003 | Shimazaki et al. | 358/3.29 |
| 2004/0061892 A1* | 4/2004 | Ferlitsch | 358/1.15 |
| 2004/0070779 A1* | 4/2004 | Ferlitsch | 358/1.13 |
| 2004/0136030 A1* | 7/2004 | Gassho | 358/1.15 |
| 2004/0190057 A1 | 9/2004 | Takahashi et al. | |
| 2004/0215467 A1 | 10/2004 | Coffman et al. | |
| 2005/0105129 A1 | 5/2005 | Takahashi et al. | |
| 2006/0221358 A1 | 10/2006 | Takahashi et al. | |
| 2009/0059285 A1* | 3/2009 | Akashi | 358/1.15 |
| 2009/0294540 A1 | 12/2009 | Johnson et al. | |
| 2012/0092702 A1 | 4/2012 | Isidore et al. | |
| 2013/0110744 A1* | 5/2013 | Hendley et al. | 705/413 |

* cited by examiner

*Primary Examiner* — Marivelisse Santiago Cordero
*Assistant Examiner* — Kevin Ky
(74) *Attorney, Agent, or Firm* — Michael A. Glenn; Perkins Coie LLP

(57) ABSTRACT

An inkjet printer is placed in communications with a print production planning and scheduling system to allow planning, monitoring, and adjusting of an automatic digital (ink jet) printing production line. In one embodiment, the order of the print jobs is defined by the print shop owner or by the associated supervisor. Each job becomes a paper based (printed) job ticket and the order in which the jobs arrive at the print operator side defines the print order. The same is true for the order at the RIP side. Any change in regards to this order requires a direct communication of the print shop owner or supervisor with the printer or RIP operator.

27 Claims, 16 Drawing Sheets

EFI Media Mapper

Media imported from MIS

| Name | Type: | Thickness | Product Id |
|---|---|---|---|
| 2 Sided Vinyl 42" Roll | Paper | 0.00 | VINYL-2S-042 |
| 2 Sided Vinyl 36" Roll | Paper | 0.00 | VINYL-2S-036 |
| 2 Sided Vinyl 30" Roll | Paper | 0.00 | VINYL-2S-030 |
| 2 Sided Vinyl 24" Roll | Paper | 0.00 | VINYL-2S-024 |
| Busmark 42" Roll | Paper | 0.00 | BUSMARK-42 |
| Busmark 36" Roll | Paper | 0.00 | BUSMARK-36 |
| Busmark 30" Roll | Paper | 0.00 | BUSMARK-30 |
| Busmark 24" Roll | Paper | 0.00 | BUSMARK-24 |
| Roll Stock | Paper | 76.20 | ROLLSTOCK2 |
| 50# 25" roll offset | Paper | 76.20 | ROLL STOCK |
| Roll Sample | Paper | 0.00 | ROLL |
| null | Paper | 3175.00 | LF ROLL |
| CONSOWEB DULL 70# 23 1/2" WEB | Paper | 0.00 | CBB0700130D3 |
| Lustro Book Gloss 80# Book 35" Roll | Paper | 101.60 | BQC8C0350L01 |
| ASTROLITH DL TXT 80# 25.5" WHT | Paper | 0.00 | A1BC80A25062 |
| finished Goods Form | Paper | 0.00 | ZFGCB12345 |
| *Classic Crest Linen Solar White | Paper | 0.00 | TN100258SCC1 |
| *Classic Crest Linen Ivory | Paper | 0.00 | TN100258ICC1 |
| *Classic Crest Linen Solar White | Paper | 0.00 | TN100195SCC1 |
| *Classic Crest Linen Ivory | Paper | 0.00 | TN100195ICC1 |
| *Classic Crest Linen Solar White | Paper | 0.00 | TN0080258SCC1 |
| *Classic Crest Linen Ivory | Paper | 0.00 | TN0080258ICC1 |
| *Classic Crest Linen Solar White | Paper | 0.00 | TN0080195SCC1 |
| *Classic Crest Linen Ivory | Paper | 0.00 | TN0080195ICC1 |
| *Classic Crest Linen Solar White | Paper | 0.00 | TN0060258SCC1 |
| *Classic Crest Linen Ivory | Paper | 0.00 | TN0060258ICC1 |
| *Classic Crest Linen Solar White | Paper | 0.00 | TN0060195SCC1 |
| *Classic Crest Linen Ivory | Paper | 0.00 | TN0060195ICC1 |

XF Media

Choose a printer:
VUTEk GS-Series

Choose an ink:
VUTEk GS

Show All ⊞ Mapped ■ Unmapped

| Name |
|---|
| ■ Arlon |
| ■ Banner |
| ■ N2 |
| ⊞ Pace Styrene |
| ■ 3M-180 |

XF Media Information
Calibration Set

VUTEk GS-Series_1000x720_M2.epl

Resolution : 1000 x 720
Color mode : CMYK Advanced
Print mode : RTL Packbits
Halftoning : Error diffusion (SE1)
Profile : VUTEk GS-Series_100
Ink Type : VUTEk GS
Media Type : Default

FIG. 4

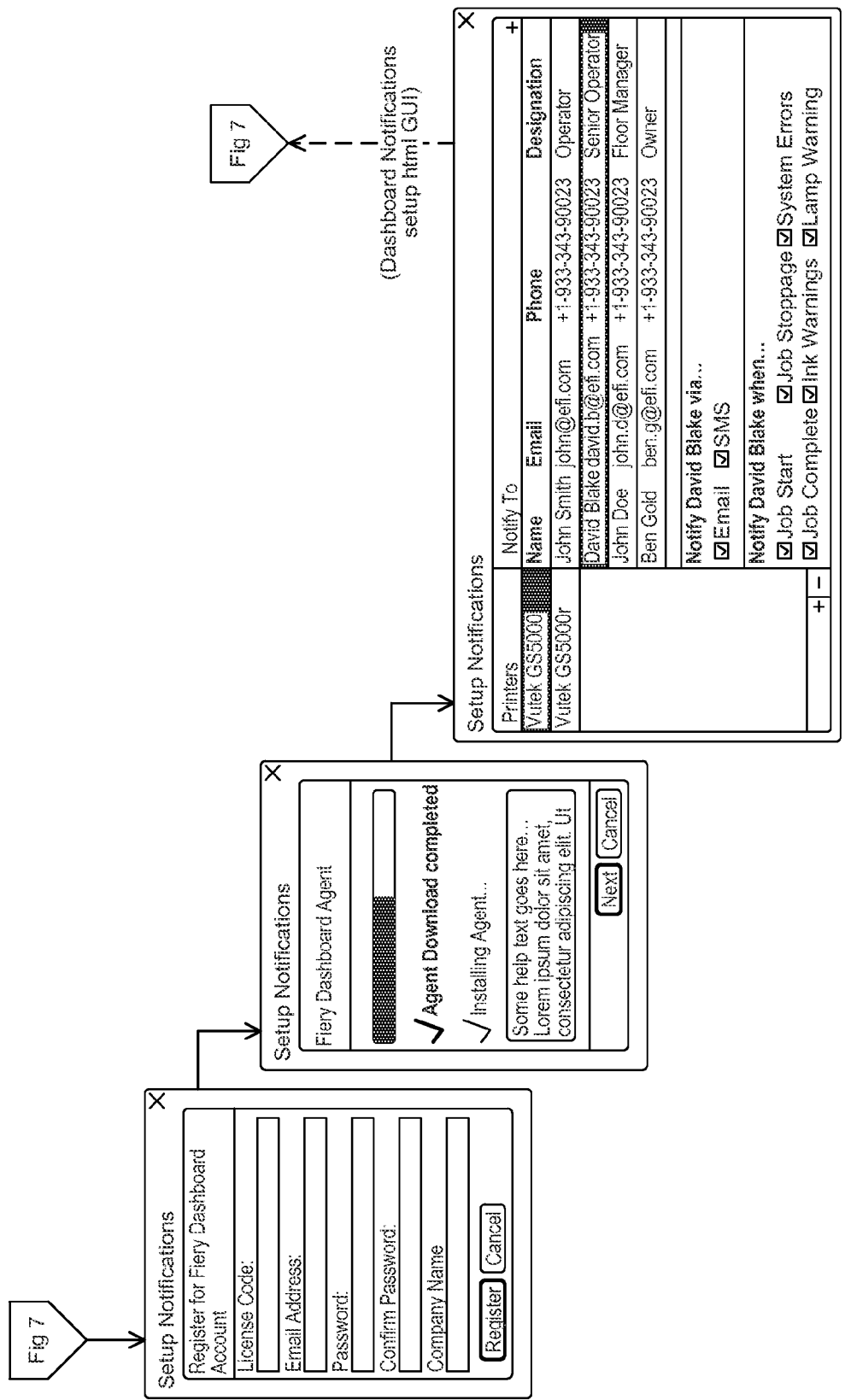
FIG. 7 (con't)

PRODUCTION PLANNING AND MONITORING IN INKJET DEVICES

CROSS REFERENCE TO RELATED APPLICATIONS

This application claims priority to U.S. provisional patent application Ser. No. 61/706,040, filed Sep. 26, 2012, which application is incorporated herein in its entirety by this reference thereto.

BACKGROUND OF THE INVENTION

1. Technical Field

The invention relates to printing. More particularly, the invention relates to production planning and monitoring in digital inkjet printing systems.

2. Description of the Background Art

The digital printing process is becoming more and more automated. All steps from the ordering until the delivery of the print product are linked together and monitored by an MIS system. Apart from this, it is necessary to handle the customer requests as carefully as possible to avoid mistakes and additional production runs to be able to deliver the product in the requested quality on time. This requires that all involved subsystems stay connected and get the correct job related information together with the job without the need for additional user interactions.

Production planning and scheduling systems, such as EFI's PrintFlow product (Electronics For Imaging, Inc., Foster City, Calif.), are widely used in the analog and toner based printing world. These systems optimize the production process and thus avoid waste and delays because of their capabilities for planning demand, monitoring status, and reacting to changes from the requirement side (new incoming orders, priority changes) or from the production (device) side.

In the wide format, super wide format or, more generally, in the ink jet world this kind of technology is not usable because known printing devices do not have the capability to communicate actively current device and job status, display the job order in the way it was scheduled from a planning and scheduling system, and react in the requested way if the order of the print jobs changes. Furthermore, current RIP engines which are implemented between production planning and scheduling systems and the inkjet printer do not have the capability to react in response to a demand from the scheduler to move printing jobs from one device to another.

The above described situation makes it very difficult to monitor the status of production in real time. It is not possible to see remotely if and which job a printer is printing, or if the printer is in print preparation, in maintenance mode, out of order, etc. Furthermore, any short time adjustments in the print order are very time consuming and require direct interaction. This is especially true in the case where a printer is out of order for a while and, as a result, the daily production must be rearranged, which requires a significant amount of direct communication and monitoring from the print shop owner or supervisor.

Further, changing the media on a roll printer is time consuming and a certain amount of extra media is typically required to wind and tack the media at the winding roll. The same is true if a printer has to be switched from one ink set to another. Also, this requires some time for print preparation and typically also includes an extra purge or other additional filling steps which affect the ink consumption.

Status updates have the same problem. Either there is a manual procedure which requests that the printer operator enter the status of a particular print job, at least issue a signal that it is printed, or there is only the option to request the job status in verbal or written form. A request to move urgent jobs from one inkjet printer which is heavily used or in maintenance for the moment to another available ink jet printing system requires a similar, time consuming, and error prone communication effort between all involved persons, i.e. administrator or supervisor, RIP operator, and printer operator.

Further, a typical digital print shop uses a paper based job ticket for each and every job to produce its print product. This job ticket is a document that includes high level parameters, such as the name and address of the customer, the name of the content file, the requested media, and certain job related definitions, such as the output size or the number of copies. The specific production parameters which are set at the digital printing press are affected by the skill set of the printing press operator. Thus, the quality and/or color of the resulting print product, is very much related to the settings that the printing press operator makes to the printing press.

All of these limitations make an optimization of the print production related to specific parameters or rules impossible.

SUMMARY OF THE INVENTION

Embodiments of the invention provide a technique that allows an inkjet printer to be connected to a print production planning and scheduling system. Embodiments of the invention also provide a combination of a production planning and scheduling system and a wide format or super wide format ink jet system where communication between these two units is established. Embodiments of the invention also allow a RIP unit to become a hub between the planning and scheduling system and the printer. Thus, embodiments of the invention overcome the above limitations and offer a solution for planning, monitoring, and adjusting an automatic digital (ink jet) printing production line.

In one embodiment, the order of the print jobs is defined by the print shop owner or by the associated supervisor. Each job becomes a paper based (printed) job ticket and the order in which the jobs arrive at the print operator side defines the print order. The same is true for the order at the RIP side. Any change in regards to this order requires a direct communication of the print shop owner or supervisor with the printer or RIP operator.

Another embodiment of the invention allows the operator at the time of order entry to define the complete production run, including printing press parameters which are today only in the hand of the printer operator. The job is created and associated to the selected, specific printing press and available printing options for such specific printing press. All parameters which are needed to print this job as defined are stored within the associated digital job ticket. This avoids, for example, mistakes within the needed further production steps, expensive reproduction or correction post a first print run, and different output results if the production runs on different machines or different sides.

This aspect of the invention thus achieves a consistent and constant output quality of print production because it moves the responsibility of the printer operator into an automated and monitored process which an administrator or a skilled person can configure prior to the real print production. The output quality thus becomes less dependent on the printer operator's skill set. If a customer requests an additional amount of previously printed product (reproduction), then this technique makes it possible to create a job using exactly the same printing parameters. As such, achieving the same output quality as the previously delivered print production becomes predictable and simpler.

BRIEF DESCRIPTION OF THE DRAWINGS

FIG. 4 shows a mapping tool for media according to the invention;

DETAILED DESCRIPTION OF THE INVENTION

Definitions and Acronyms

Figure 1:
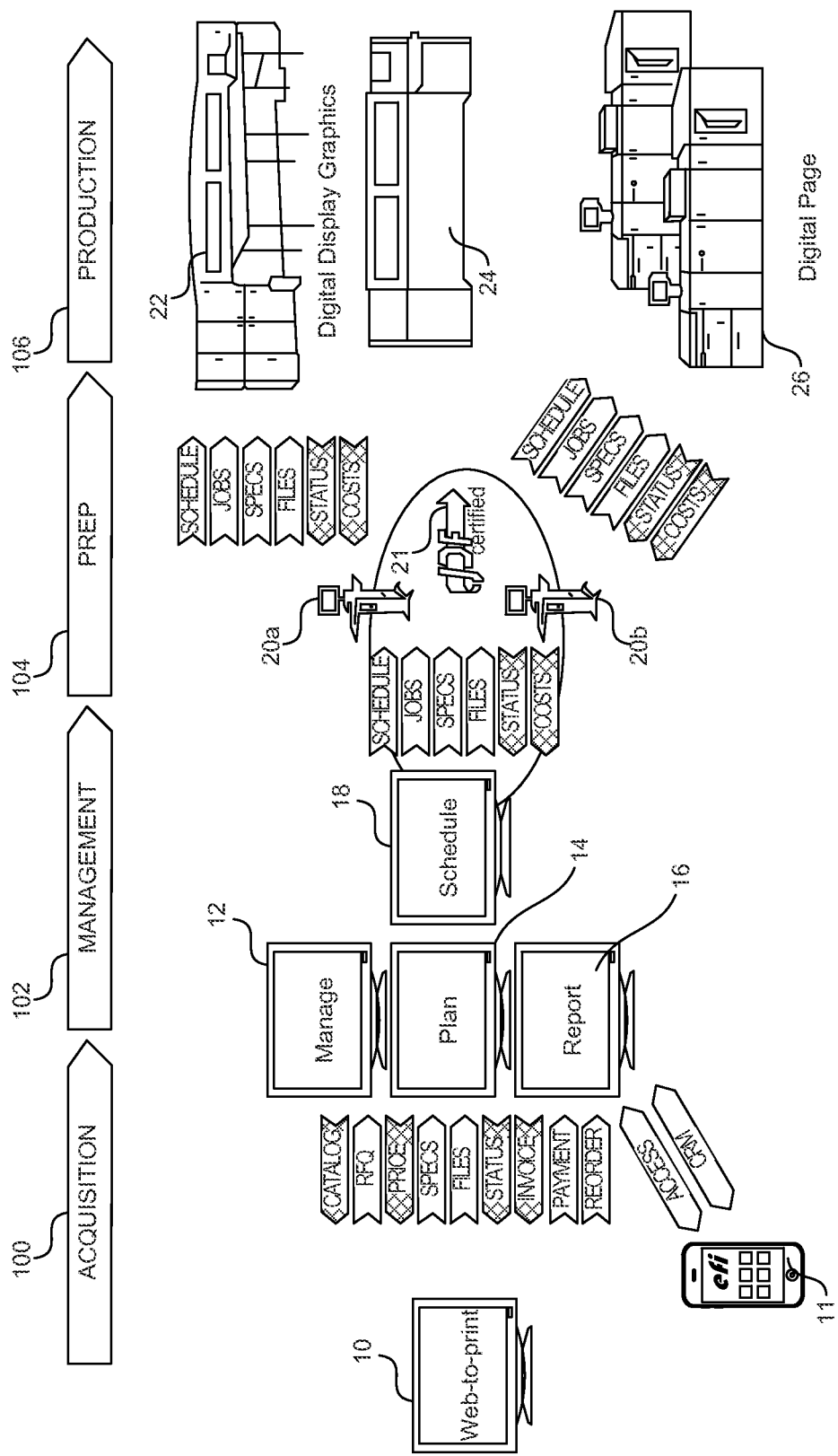
FIG. 1 is a block schematic diagram that shows an architecture for production planning and monitoring of inkjet devices according to the invention.

For purposes of the discussion herein, the following terms and acronyms have the attributed meaning:
UI—User Interface, an application used for job submission, job management, and for controlling printers;
Printer—the printer refers to the print engine itself, as well as to the suite of middleware print services and the UI running on a dedicated Linux or other system that is attached to the print engine;
CORBA—Common Object Request Broker Architecture;
JDF—Job Definition Format;
JMF—Job Messaging Format;
RIP—Raster Image Processor, such as EFI's Fiery XF RIP;
MIS—Management Information System, such as EFI's Pace and Monarch MIS; and
DSF—Digital Store Front.
Discussion Today digital inkjet presses have a lot of specific parameters which the printer operator sets depending on the operator's knowledge, experience, and the particular job requirements. This opens the door for expensive mistakes during particular print production runs. The herein described technique make it possible for the digital inkjet printing press to communicate details of available parameters while connecting within the print architecture, such that the systems which are creating and defining the print jobs, e.g. RIP, MIS, store front, are using the parameters as announced.

Embodiments of the invention provide a technique that allows an inkjet printer to be connected to a print production planning and scheduling system. Embodiments of the invention also provide a combination of a production planning and scheduling system and a wide format or super wide format ink jet system where communication between these two units is established. Embodiments of the invention also allow a RIP unit to become a hub between the planning and scheduling system and the printer. Thus, embodiments of the invention overcome the above limitations and offer a solution for planning, monitoring, and adjusting an automatic digital (ink jet) printing production line.

Embodiments of the invention comprise two elements, i.e.:
A facility that communicates printer specific parameters from the digital inkjet printing press to the associated RIP unit or connected print MIS or digital store front units; and
A facility that understands and uses the submitted information for digital print production planning and job submission.

This makes it possible to plan and optimize the entire printing process. As a very simple example, embodiments of the invention avoid the need to submit a job which requires a white backing, i.e. creating an extra white layer, to a press which is not equipped with a white ink channel. Furthermore, it is also possible for particular combinations of machines and printing parameters to be used or avoided. For instance, embodiments of the invention allow one to request different settings where a print job requires specified LED curing in combination with specific media, a particular curing setting, and a particular shutter mode, while allowing regular UV ink curing on the same material.

The provision of multiple combinations of parameters is an important aspect of the invention. In this way, the full combination of printing parameters is taken into account to allow for consistent production and output quality. Further, defining the print product completely at the point where the job enters the workflow eliminates the relationship of the output quality from the skill set of the available printer operator. Knowing the production parameters at the beginning allows optimization of the whole production workflow and planning process. Thus, jobs which require the same machine configuration can be queued up in such a way to reduce the amount of time for changing the machine configuration, e.g. from roll to sheet or from 4 to 8 color print mode, etc.

Interoperation of the various systems elements is as follows in an embodiment of the invention:
When the digital inkjet printing press is connected to the RIP unit, with further connections to the print MIS or store front systems, the press sends a message to these systems and announces the features and options that it has available. If there are multiple configurations of one digital printing system on the market or one digital printing system has multiple configuration or options possible, the RIP unit and the connected print MIS or store front systems can then adapt their user interface related to the published feature set so that a user can choose from among the options which are available at the particular digital press.
The selected options are sent to the digital printing press with the job as job parameters. This step excludes the possibility that various mistakes can be made. Thus, because of the previously announced printing parameters, only those printing options that are available at the printer are sent to the printer. In such case, the printer's limitations are known in advance, and it is therefore not possible to make requests for unsupported options.

Embodiments of the invention also allow an operator to change processing parameters after the creation and submission of the job. For example, assume that an order for 100 banners is placed by a customer. The job is then processed and is at the printer. At this point, the customer changes the order and requests 120 banners. With the invention herein, it is simple to update the job from the MIS or from the store front and accordingly update the job at the printer to have 120 banners printed instead of only 100 banners as originally requested.

Some changes might require re-processing of the job. For example, if the customer has decided to use another media, then the MIS sends an AbortQueueEntry and a RemoveQueueEntry message which stops the job from further processing (although the physical printing process itself is not stopped), removes the job from the RIP or the printer queue, and submits the updated job into the process.

FIG. 1 is a block schematic diagram that shows an architecture for production planning and monitoring of inkjet devices according to the invention. In FIG. 1, a presently preferred embodiment of the invention is shown comprising an acquisition function (DSF) (100), a management function (MIS) (102), preparation function (RIP) (104), and a production function (printer) (106).

The acquisition function includes a digital store front facility 10 that provides the management function, for example via customized customer desktops, with requests for quotes (RFQ), specifications (SPECS), files, and payment and reorder information and that receives from the management function catalog information, pricing, status, and invoices; and also includes a remote access facility 11 that allows system access and customer relations management functions.

In addition to its interaction with the acquisition function, the management function addressed global print business management and provides MIS facilities that allow for job and system management 12, planning 14, reporting 16, and scheduling 18. The management function provides schedule and job information, specifications, and files to the preparation function and receives status and cost information from the preparation function.

The preparation function, as part of its interaction with the management function, includes RIPs that provide, for example, proofing and photo work (20*a*) and advanced PDF workflow, automated preflight, RIP, and color management functions (20*b*). The preparation function provides job tickets 21 (discussed in detail below) for use in connection with the production function. Thus, the preparation function provides schedule and job information, specifications, and files to the production function and receives status and cost information therefrom.

The production function, in addition to the printer interface function, includes printers 22, 24, 26, such as digital display graphic printers and digital page printers. These can be any type of printer, such as flatbed and hybrid wide format printers, high definitions super wide printers, industrial inkjet systems, ceramic and other substrate printers, as well as global support for all other printing and finishing processes.

Embodiments of the invention also allow the system administrator to define and identify full media parameter configurations. Currently, such configurations are related to the skill set of the printing press operator. Using such configurations pursuant to the invention avoids situations where the print shop runs into quality issues and thus enables production having constant and predictable quality.

A further advantage of the herein disclosed invention is that the print shop owner can associate a particular price to a particular print option, product, or product quality. For instance, if a digital printing press offers two resolutions but they differ in the required printing times, the print shop owner can configure the pricing schema of the digital store front in such a way that two different prices are provided and are related to the particular selected output quality. This is also true for more sophisticated settings, such as omitting curing or smoothing. Thus, jobs with specific settings are only sent to printers which support a particular feature, assuming the print shop has multiple different configured digital printing presses. At the same time, the customer gets the requested output quality, in this case the requested output resolution, curing, or smoothing level. This offers a significant advantage with regard to production consistency and customer satisfaction. Accordingly, configuring print products in such a manner makes it possible for reproduction of the same job at another location or on another device, while delivering the same quality results.

Embodiments of the invention go beyond a simple connectivity of different components of the digital workflow because very specific parameters, which are tightly coupled to the digital inkjet printing press, are communicated among the various elements of the workflow. Currently, only the printer operator has control of these parameters but, with the invention, such local printer adjustments become system wide print job parameters that they are planned and used for print production.

Currently, wide format or super wide format ink jet printers can show active print jobs at a machine control panel. The jobs are usually arranged in lists, queues, or workspaces (referred to herein as "workspaces"). Typically, workspaces are provided for jobs which have to be printed, jobs which are printed already, as well additional print workspaces and features for the printer operator to see and organize his work. Embodiments of the invention concern both changes on the printer and also the requirements for the RIP to make such a device and process actively monitorable and manageable. The base requirement is that a bidirectional communication be established between the MIS, e.g. EFI Pace, EFI Monarch, or EFI Radius, the production planning and scheduling system, e.g. EFI PrintFlow, the RIP, e.g. EFI Fiery XF, and the printer, e.g. EFI VUTEk GS 3250r or EFI R3225. This communication can be based on a standard, such as the CIP4 JDF (see www.cip4.org) or any other proprietary implementation.

In an embodiment of the invention, the printer must be able to receive messages or notifications. These could announce new print jobs or include changes or further information for already submitted jobs, reschedule the order of the jobs within the active print workspace, remove jobs from the active print workspace, etc. For each of these messages or notifications, the printer must exhibit an appropriate response. Therefore, the printer requires a receiver for receiving messages from registered senders, an interpreter for understanding the message or notification, and a translator from the communication language into the machine language. An active handler which performs the needed modifications on the database, sends message to the printer UI or connected applications, etc. is also needed.

In the opposite direction, the printer also must be able to send messages or notifications actively for all events which could happen. Such events include, for example:

New job arrived (received successful or failed);
Job starts printing;
Print progress updates;
Job is printed, including accounting parameters;

Job is canceled, including accounting parameters;
An error occurred while printing; and
Job deleted from the active workspace.

Furthermore, the printer has to communicate status information about the printer itself, such as printing, idle, on maintenance, purging, etc. Therefore, the printer also requires changes in the user interface (UI) or at the data base to create an internal event at the printer side, the provision of a listener that is waiting for the arrival of such events and that translates them into the communication language, and a sender that submits the message to the registered receiver.

The print production planning and scheduling system receives these messages or update information and it updates the production plan accordingly. Any new print job which arrives at the scheduling system is scheduled and assigned to the printer that best matches the requirements of the print job. The print job is added to the workspace so that the different rules for optimizing the production process are fulfilled. These rules are related to the particular production planning and scheduling system or to the individual setting of the digital printing company.

Any change in the print job order creates an event which actively sends update messages via the connected RIP to the printer. The workspace of active print jobs at the printer shows the job order in such a way that it represents the production order of the production planning and scheduling system.

Events include, for example:
  The information that a new job is ready for printing, which creates an action on the printer side that it adds this job to the defined place in the print job workspace;
  The information that the order has to be changed, which creates an action on the printer side to rearrange the job order in the print job workspace; and
  The information that a job has to be removed, which creates an action on the printer side that the particular job is deleted from the print job workspace, although actively removing of print jobs from the workspace is not usually possible if this job is currently printing.

The print workspace at the printer can be actively managed with the foregoing events. Any optimization of the production planning and scheduling system that is applicable to the print production process uses one or multiple of these events. This allows reducing, for instance, the number of media changes because jobs which are using the same media can be queued accordingly. The same is true for jobs which request a particular ink set. This drastically reduces the make ready time for the print production, and also reduces the amount of waste on media and ink. Those skilled in the art will appreciate that, beside these events described above, additional messages and updates can be implemented.

Communication between the print production planning and scheduling system and the printer also includes the RIP and the MIS system. A planning and scheduling system for the print process is more useful for a larger printing company. Thus, if there are, for instance, two printers within a company which receive the print jobs from one RIP, then this RIP becomes the hub for these two devices. If the print production planning and scheduling system needs to move one job from printer (A) to printer (B), then this is managed from the RIP. The RIP receives the information about this change from the planning and scheduling system, it sends the request for removing the job to printer (A), double checks if a new processing of the job is required for the device (B), prepares the new print data (if required), and sends the new or the original print data to printer (B). This job is added at the requested position to the workspace of active print jobs at printer (B). Therefore, the RIP must include a similar implementation of listener, receiver, translator, event handler, sender, etc. as described hereinabove.

Each of the foregoing transactions includes not only the notification or meta data, but also the content file. This further limits the possibility of making errors.

If the company is bigger and has not just multiple printers, but also has multiple RIP systems, perhaps at multiple locations, the above described scenario also involves the MIS system when removing a particular job from the printer (A) and the RIP (a) and moving it to the RIP (b) and the printer (B). Note that the print production planning and scheduling system is typically a part of the MIS or tightly coupled with the MIS.

The foregoing capability makes it possible to avoid delays in production because print jobs can be moved from a machine which is currently heavily used to a machine which is idle at the moment or which can offer a slot for this production soon. This procedure is possible between machines of the same type. In this case the re-ripping as described hereinabove might be not required. This procedure is also possible between machines of different types.

One advantage of the invention delivers this implementation in the case of an unforeseen event. For example, if a printer is out of order and the time frame until it is restored completely can not be foreseen, or the printer is of a size that negatively impacts the delivery schedule, the waiting production at this machine can be rerouted to other devices within the plant. This does not require any special communication between the various equipment operators. Rather, the manager at the print production planning and scheduling system can move the high priority jobs to other devices and change the schedule for these devices, if required. All needed information and events are sent from this central place and the job workspace of the active print jobs on all involved printers is updated immediately. The jobs are removed from the printer which is out of order, the RIPs produce new print files if necessary, and the print files are added at the correct places to the other printers as scheduled. For the printer operators, there is no change on their regular work. They continue printing jobs in order as requested and make sure that all of the print products are produced with the requested quality.

The discussion below describes some of the features that are managed in a presently preferred embodiment of the invention, although those skilled in the art will appreciate that the invention may include other features.

White ink support: VUTEk GS printers, used in an exemplary embodiment of the invention, are capable of handling white as an extra colorant. There are different use cases for this extra colorant. For example, while printing on transparent media white can used as separation layer between the front and the back side image, as layer to improve the image quality for backlight application, but also as a separate image layer to create specific effects within the print product. DSF and MIS are now able to define the usage of white ink as a job parameter. Beside the option to handle separate white layers within the content files all specific white options from, for example, the Fiery XF RIP are supported:

White as spot color: The spot color of this name or alias from a separated document prints white, i.e. white is handled as pure spot color.
  White mode Inked Image: Add white ink on every pixel which does not have CMYK=0,0,0,0 on the printer side. The RIP takes the maximum of all other colorants and applies this as white value.
  White mode Bounding box: Add white ink on every pixel. The white ink value can be defined within the JDF ticket, but it is fixed for all pixels of the image.

White mode Inked Image Fix: Add white ink on every pixel which does not have CMYK=0,0,0,0 on the printer side. The white ink value can be defined within the JDF ticket, but it is fixed for all pixels.

White mode inverse: Add white ink on every pixel which has CMYK=0,0,0,0 on the printer side. The white ink value can be defined within the JDF ticket, but it is fixed for all pixels.

White mode Optimized: Add white ink on every pixel accordingly to the CMYK colorant values and the white point of the media. This mode enlarges the gamut and makes a brighter output possible.

White mode off: No white layer is created.

Status update to the planner: Producing SWF file format products (see www.adobe.com/content/dam/Adobe/en/dev-net/swf/pdf/swf_file_format_spec_v1 0.pdf) could take a while. Printing ten copies of a 5×5 meter banner can take around 2.5 hours (VUTEk GS5000r printer with 600 dpi, CMYKcmyk mode and productivity of 96 m^2/hour). In an embodiment of the invention, the planner module gets a status update after each and every copy. This helps the operator to see where the current production stays and when the start of the next production run could be expected.

Shorten time to production: The RIP delivers RTL files to the printers. These files include information which is mandatory for the correct print setup of the machine and they also provide important information to the printer operator. These use cases make it mandatory to parse the RTL files after they are downloaded on the printer side. Because these files are large, i.e. the average size is related to the use cases between 1 and 5 GB but also RTL files beyond 100 GB are not uncommon, this parsing is a time consuming effort. In an embodiment of the invention, the RIP delivers all parameters but also the preview as part of the bidirectional communication to the printer. This allows skipping the parsing and showing the job immediately at the print station.

A Presently Preferred Implementation

The following provides a discussion of the integration of online an ordering system, MIS, RIP, and printer in a detailed matter. It describes the feature set of this development and in details the job ticketing between an EFI Fiery XF (RIP) and an EFI VUTEk printer and how to achieve that using JDF. Those skilled in the art will appreciate that the invention may be practiced with devices other than those manufactured by EFI (Fiery) and VUTEk, as well as with other protocols than those expressed by in the JDF specification.

The preferred integration is an http based JMF interface exposed by the printer middleware. The discussion below primarily concerns a most complex integration scenario DSF<->MIS<->RIP<->printer. Those skilled in the art will appreciate that any subset of these types of devices work together using the same inventive technique disclosed and thus establishes a similar integration level. Such subsets are, for example:

DSF—RIP—printer
MIS—RIP—printer
RIP—printer

Those skilled in the at will appreciate that the herein described integration details could be adapted to other MIS system and other printers as well.

The following provides an overview about goals which should be reached with this integration:

Building up an end-to-end, automated digital workflow solution;
Establishing a bi-directional communication between the different systems of the workflow;
Monitoring the product status in the MIS and getting accounting information back; and
Avoiding mistakes within the production by sending and applying the product definitions automatically to the involved systems.

JDF is the standard job ticket within the printing process. It builds the base for the whole communication between the DSF, MIS, and RIP. An embodiment of the invention creates a new link between the RIP and the printer. Although the discussion herein concerns JDF, those skilled in the art will appreciate that any known implementation would fulfill the technical requirements of this integration.

System Overview

Figure 2:
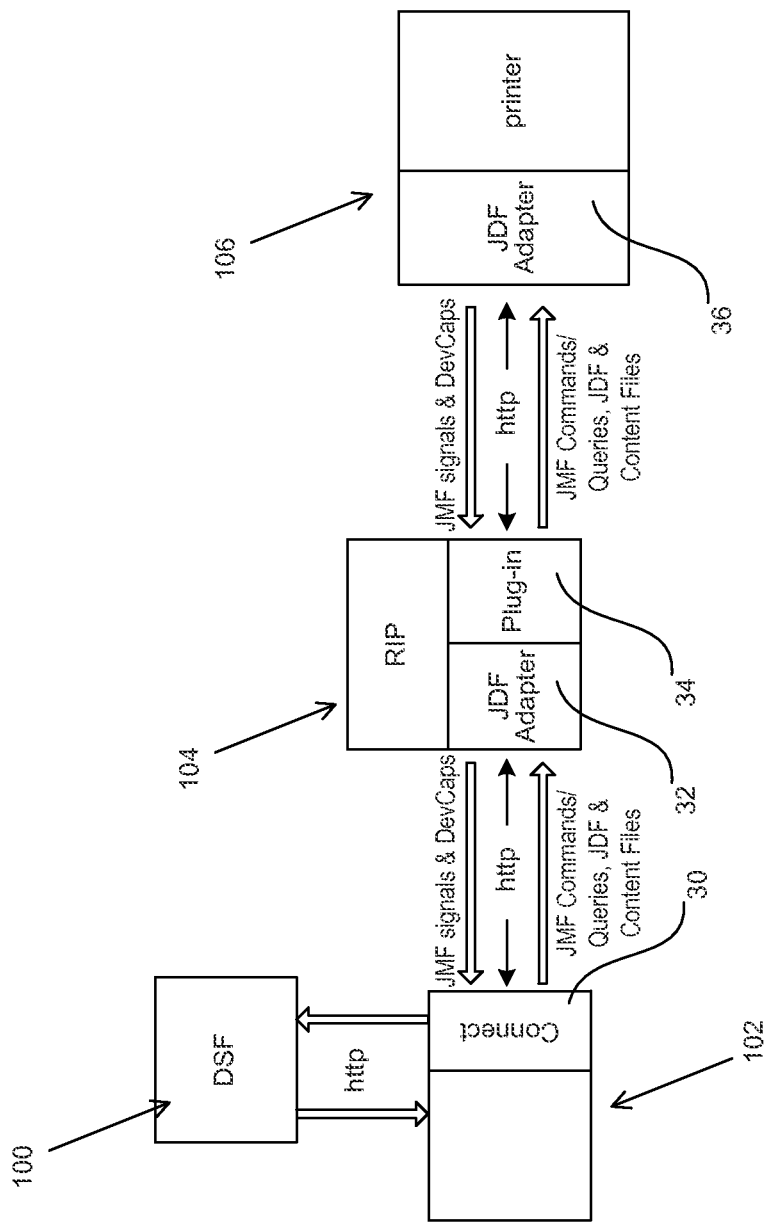
FIG. 2 is a high level block schematic diagram of JDF integration between the DSF and a printer according to the invention.

FIG. 2 is a block diagram that shows JDF integration between the DSF (100), MIS (102), RIP (104), and production (106) facilities.

The DSF communicates with the MIS facility for:
Retrieving the device capabilities of the RIP and the printer;
Sending and responding to JMF commands and queries; and
Sending a JDF ticket for a created job in DSF via a JMF command.

The MIS sends to the DSF:
JMF Signals to a subscription URL specified by the MIS; and
JMF Signals to update the job status.

The MIS communicates via an MIS connect interface 30 with the JDF interface 32 of the RIP for:
Retrieving the device capabilities of a JDF device configured in the RIP;
Publishing an MIS media list to the RIP;
Sending JMF signals to a subscription for JDF commands; and
Sending JMF commands and queries.

The RIP sends to the MIS:
Device capabilities to publish the supported options of the connected device;
JMF signals to a subscription URL specified by the MIS;
JMF signals to update the job status, device status, etc.; and
Accounting information, such as media and ink usage and printing and processing time.

The RIP communicates via a plug-in or other interface 34 with the JDF interface 36 of the printer for:
Retrieving the device capabilities of the printer;
Pushing an MIS media list forward to the printer; and
Sending JMF commands and queries.

The printer sends to the RIP:
Device capabilities to publish the supported options of the connected device;
JMF signals to a subscription URL specified by the RIP;
JMF signals to update the job status, device status, etc.; and
Accounting information, such as media and ink usage and printing and processing time.

The RIP downloads the content files for a given job from the URL sent from the MIS or DSF. The printer downloads the content files for the given job from the URL sent from the RIP.

Figure 3:
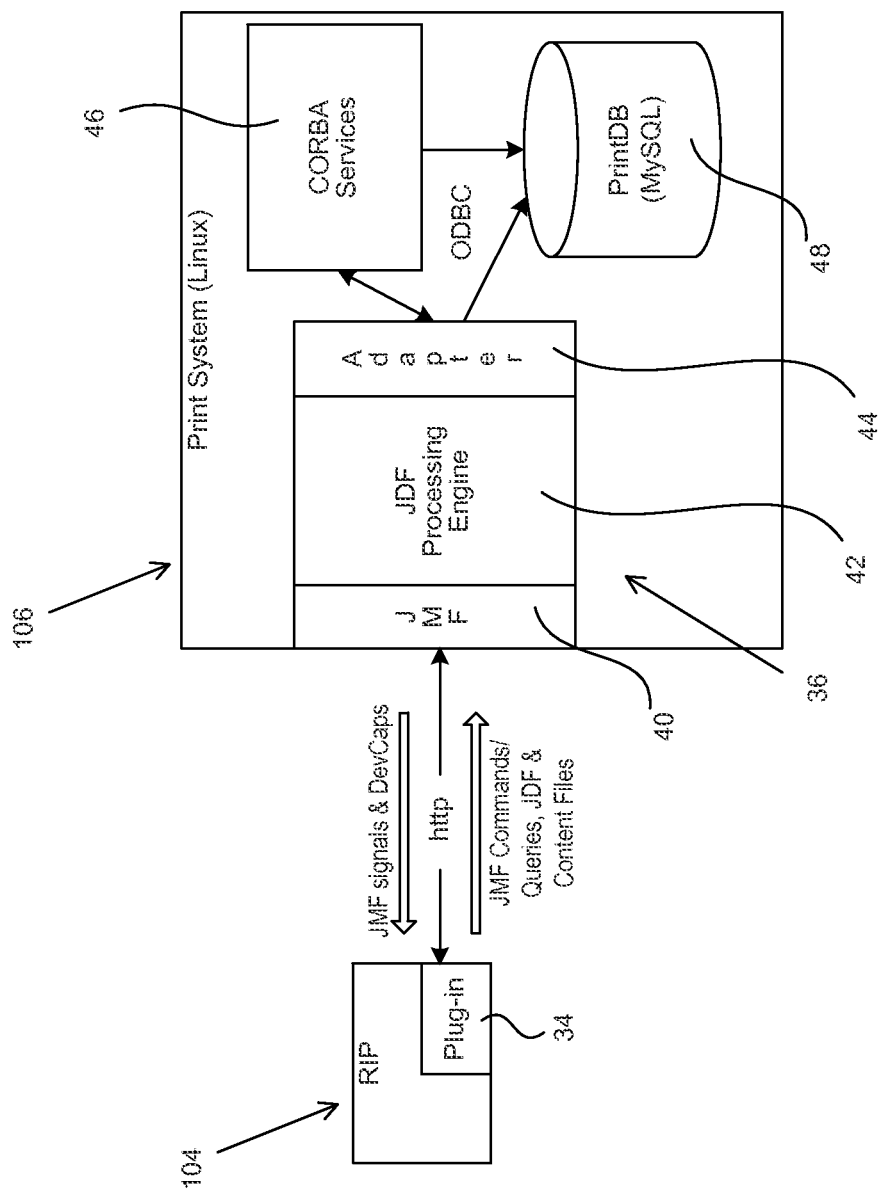
FIG. 3 is a block schematic diagram that shows RIP to printer integration and depicts how the RIP communicates with the printer, as well as which parts of the printer are linked and the manner in which they are linked, according to the invention.

FIG. 3 is a block schematic diagram that shows more detail of RIP—printer integration. As can be seen, the printer comprises a Linux-based print system that includes the JDF adapter 36 for the printer which, in turn, includes a JMF signal processor 40, JDF processing engine 42, and adapter 44. Those skilled in the art will appreciate that the printer need not be Linux-based. The print system also includes CORBA services 46 and a print database 48.

Generic Job Life Cycle

Even if every customer has its own specific workflow, a generic life cycle of a product run would be as follows:

1. The customer describes the product in the DSF or any other online or offline ordering system.
2. The print supplier selects a media type and a machine type for this production based on the description from the customer within the MIS or within his ordering system; does a cost estimation based on the defined parameters, e.g. media, printer, quality, etc., and prepares a quotation; and estimates the production process within his scheduling software and defines a possible delivery date.
3. The customer accepts this quotation.
4. The print supplier creates a job within the MIS and defines the machine, media, and ink set for this production; and optionally schedules the production within his scheduling software.
5. The MIS creates the job and sends a JDF to the RIP.
6. The RIP receives the JDF job and downloads the content; and interprets the JDF and creates a job in the RIP job list based on the processing parameters, such as:
   Job name, Job ID, Description
   Media information (media type, media size)
   Ink set definition
   Output parameters (size, duplex)
   Numbers of copies
   Color management parameters
   Customer information (displayed within the RIP client)
   Layout parameters, such as scaling, rotation, flip, mirror.

The RIP sets the priority for the processing based on the defined production schedule (due date); processes the job based on the JDF definition; sends status messages (JMF) back to the MIS; sends updated JDF to the printer; and within a ReturnQueueEntry message, the RIP reports the processing time to the MIS.

7. The printer receives the JDF job and downloads the content (RTL file); interprets the JDF and creates a job in the printer GUI job list based on the processing parameters, such as:
   Job name, Job ID, Description
   Printer parameter as set within the RIP, e.g. Print mode, Smoothing, etc.
   Media information (media type, media size)
   Ink set definition (already defined in the RTL job)
   Output parameters (size, duplex)
   Numbers of copies
   Finishing information
   Customer information The printer sets the priority for the processing based on the defined production schedule (due date) and makes this information visible to the print operator; prints the job based on the JDF definition; sends status messages back to the RIP (the RIP pushes the status update messages future to the DSF or MIS); and within a ReturnQueueEntry message the following audit information is sent:
   Ink usage
   Media usage
   Printing time
   Total number (number of goods and number of waste)

The printer closes the job and sends the JDF back to the RIP (the RIP can update the JDF another time) and communicates the results future to the MIS.

Description of the End to End Workflow

General

The resources such as media and ink must be synchronized between the MIS, RIP, and printer to achieve maximum automation. This also reduces the possibility of manual errors in selecting the right resources and setting the right attributes during the job ticket creation and transfer process in an end-to-end workflow.

DSF/MIS—RIP—Printer

When all the three systems—MIS, RIP, and printer—are present in a print shop, the MIS assumes the manager role as far as resource management is concerned. In a scenario when the MIS is newly added to an existing RIP-printer combination, all of the resources in the shop must be added to MIS first and then they can be pushed to the RIP.

If the DSF is present and the MIS is absent, then the DSF assumes the role of the manager as far as resource management is concerned. If both the DSF and MIS are present, then the MIS is the manager of resources. In the discussion below, the MIS is treated as the manager, although DSF also fits into that role. Note the workflow description is also true if the DSF or another MIS takes over the manager role.

Resource Synchronization

Although it is ideal to have a fully automated workflow for the synchronizing the media and ink resources across the three systems, in some case it is not practical. The steps below explain how the three systems can synchronize media and inks to achieve a semi-automatic end-to-end workflow for job submission.

1. The MIS does a discovery of RIP servers on the print shop network.
2. Once it finds the RIP, the MIS pushes media and ink resources via a JMF Resource Command.
3. On receiving the MIS resources, the RIP adds them to its database.
4. The RIP also issues a JMF Resource Command to the printer to add the MIS media to its media database and MIS inks to its ink list with MIS Ids. The printer uses default settings for certain printer specific options because MIS or RIP operators may not be qualified to select those options.
5. The RIP administrator then maps the MIS media to the RIP media set using a mapping tool. The RIP sets its JDF device status as Not Ready. This prevents the MIS from sending KnownDevices or other JMF Queries/Commands. The MIS keeps retrying the query using a timer to check the RIP JDF device status.
6. After the mapping is done, the RIP sets its JDF device status as Ready and waits for the KnownDevices query from the MIS.
7. The MIS administrator adds the discovered RIP device and sends a KnownDevices JMF query.
8. The RIP finds the original MIS media from its map.
9. The RIP also determines the ink set (CMYK or CMYKcmyk or CMYKcmykW etc.) from its media set corresponding to that MIS media.
10. The RIP returns both the MIS media and ink set in the response to the KnownDevices query as DevCaps.
11. The MIS then associates these resources with the RIP JDF device that was registered with it. If the MIS operator chooses one of those media and ink resources for JDF Job submission to the RIP, the job runs automatically through the RIP. Otherwise, a manual user intervention at the RIP side is required.

Job Handling

1. Upon receiving a JDF job from the MIS, the RIP finds its media set from the map, processes the job, and creates the color managed RTL file ready to be printed.
   a. The RIP detects the correct calibration set based on the build in map of the MIS media and ink set combination. Another important parameter for the detection of the correct calibration set is the quality, means print resolution.

For example:

i. The MIS has a media Vinyl_0021 this is mapped in the RIP to the media name Vinyl; and ii. The RIP has four different calibration sets (EPL+ICC profile) for Vinyl:

1. Vinyl for the ink set CMYKcmyk with 600×360 dpi
2. Vinyl for the ink set CMYKcmyk with 1000×720 dpi
3. Vinyl for the ink set CMYK with 600×360 dpi
4. Vinyl for the ink set CMYK with 1000×720 dpi iii. Based on the defined ink set and the quality mode within the MIS, a correct detection of the calibration set is possible. That is, assuming that the printer has, for example, two possible resolutions and two possible ink sets, only one calibration set is available for each combination. If a certain combination is not available but requested for a specific job, the RIP stops the automatic processing and requests a operator intervention.

b. The RIP operator may create a nesting or a Step&Repeat job containing the job sent by the MIS to save media. The RTL created by RIP is for the nesting or the Step&Repeat job.

c. In the case of a nesting job, the RIP calculates an estimated ink volume for each colorant in the original job sent by the MIS. That is, after the print run, media and ink usage information is provided to the RIP by the printer. Thus, the RIP builds the ratio between these volumes and the total volume for the whole nesting and saves those ratios into the job ticket. The ratio of ink usage to media for each separate job is then sent back to the MIS.

d. For Tiling/Multi-page job, the RIP splits the original job sent by the MIS into multiple parts and submits them separately to the printer.

2. The RIP modifies the RunList resource URL in the JDF to point to the created RTL file and submits the JDF job to the printer.

3. The printer JDF gateway creates a job in the printer with the ticket options specified in the JDF. For the printer specific options which cannot be determined remotely in the MIS or RIP, the printer sets the default options.

4. The printer operator opens the job in the UI, verifies the various job options, and overrides them if required.

a. The printer operator may add the job sent by the RIP into a Queue or Multi-layer.

b. As in the case of the RIP, for each color in the original RTL job sent by the RIP, the printer calculates the ratio of that color in the queue or multi-layer job created in the printer.

5. After printing, the printer gathers the ink and media consumption values.

a. If it is a queue/multi-layer job, The printer calculates the media and ink consumption values for the original job sent by the RIP based on the ratios determined above at step 4b.

6. The printer then adds the media and ink consumption values along with the MIS resource IDs to the AuditPool section of the JDF and sends this back to the RIP as a Retun-JDF Ticket.

7. The RIP receives the JDF and performs the following calculations as required:

a. If the job is a nesting job in the RIP, the RIP calculates the actual ink consumption values for the original job sent by the MIS based on the ratios saved above at step 1c. For media consumption, the RIP sends the ratios of areas of each job in comparison with the area of the bounding rectangle of the nested job in the audit info. The MIS uses those ratios to calculate the media cost for each job.

b. If the job is a tiling/multi-page job in the RIP, the RIP adds the media and ink consumption values for each part of the job submitted to the printer separately.

8. The MIS then determines the actual quantities of media and inks used for the original job and determines the costing.

RIP—Printer

In the absence of a manager, such as the MIS or DSF in the workflow, the RIP acts as the manager. The steps below explain how the two systems can synchronize media and inks to achieve a semi-automatic end-to-end workflow.

1. Once the media sets are defined for the print device in the RIP, it issues a JMF resource Command to the printer to add the RIP media and inks to the print or database. The printer uses default settings for certain printer specific options because the RIP operator may not be qualified to select those options.

2. Once the job to be printed on printer is submitted to the RIP, it processes the job and creates the color managed RTL file ready to be printed.

3. The RIP creates a JDF ticket with the appropriate job options. It sets the RunList resource URL in the JDF to point to the created RTL file and submits the JDF job to the printer.

4. The printer JDF gateway creates a job in the printer with the ticket options specified in JDF. For the printer specific options which cannot be determined remotely in the RIP, the printer sets the default options.

5. The printer operator opens the job in the UI, verifies the various job options, overrides them if required, and sends the job for printing.

6. After printing, the printer gathers the ink and media consumption values, adds them to the AuditTrail section of JDF and sends it back to the RIP as a return JDF ticket.

7. The RIP receives it and displays it in its client GUI.

JDF/JMF Implementation Details

Overview

The following discussion provides an overview of the JDF parameters and attributes for a presently preferred embodiment of the invention. Those skilled in the art will appreciate that these parameters and attributes are provided solely for purposes of illustration and example and not by way of limitation of the inventive subject matter herein disclosed.

1. Parameters sent from the DSF/MIS to the RIP and printer:
JobID, JobPartID
Media:
    Definition of the media type
    Definition of the media size
Ink (definition of the ink set)
Due date
Number of copies
Print quality (print resolution)
Finishing:
    Special white ink printing (layer at the top, bottom or in between or as special color)
    Special clear ink printing (layer at the top or bottom or as special color)
    Grommet marks
    Cut marks
    Settings for contour cutting
Layout:
    Size (scaling)
    Center
    x, y offsets
    Mirroring (setting for printing on transparent medias)
Color management
Customer information 2. Parameters sent back to the MIS:
Media usage
Ink usage
Processing time
Printing time
Wastage of ink and media 3. Notification and queries sent to the RIP and printer:
Known devices query
Known messages
Resource Command
SubmitQueueEntry Command
ReSubmitQueueEntry Command
AbortQueueEntry
RemoveQueueEntry
QueueStatus
Subscription
4. Notification and queries sent to the MIS:
Status signals and return JDF
Device capabilities
Due Date The due date parameter is an important parameter to signal the RIP and the printer operator when a job has to be finalized and make it possible to schedule the daily work correctly. This parameter becomes even more important if the customer is planning its work with a scheduling system. At the RIP side, the due date has to have an influence on the processing priority. This means that jobs with a sooner due date have to be processed earlier. At the printer side, it is information for the printer operator to define his production runs properly. A color indicator at the UI helps to see immediately which job is to be produced next.

Number of Copies

The number of copies parameter defines how many printouts the customer likes to buy. It is also an important parameter to calculate at the end of a production how many good and waste printouts were made. In the DSF or MIS, the operator defines how many copies should be printed. If the RIP operator decides to place more than one copy at media to use the printer more optimally, the number of copies parameter (better the number of print runs) sent to the printer is adapted automatically. The same happen at the printer side if the printer operator creates a layout with multiple copies from the same job.

Print Quality

The print quality parameter defines which output resolution has to be used. Based on this definition, the RIP chooses the correct calibration set for the selected media or, if it is not available, shows a warning message to the operator.

The print quality defines the resolution of the RTL file. This parameter is not needed at the printer side.

Finishing

JDF supports a wide range of finishing parameters. One important set of parameters are the cut and crop marks. The typical RIP supports a wide range of different mark types which have to be applied accordingly to the JDF definition. This includes also the usage of grommet marks or even settings for the creation of contour cutting information to cut the printout afterwards at a cut table.

The marks parameter defines a specific content within the RTL file. This parameter is not needed at the printer side.

Another important parameter is the definition of an extra layer using white or clear ink. (please see the discussion above).

Layout

The content might not have the size of the final print product. The DSF or MIS can define scaling as a layout parameter for a job or a final document size. Apart from that, it is also possible to define the arrangement of the content at the media, e.g. x, y offsets, center on page and if the job should be printed mirrored.

Layout parameters define the print ready output file from the RIP. They are not needed at the printer side.

Color Management

The MIS can define the usage of specific color management parameters.

Customer Information

This set of JDF parameters is used for sharing the information about the customer, e.g. name, address, etc. with the RIP and printer operator.

JMF Messages, Commands and Queries

Known Devices Query

The KnownDevice query message requests information about the devices that are controlled by a controller. The response is a DeviceList which is list of DeviceInfo elements controlled by the controller that receives the query. In the case of RIP-printer integration, the printer JDF gateway acts as the Controller and the only device is the printer.

Known Messages

The KnownMessages query is used to request the supported JMF messages from the connected JDF device. The KnownMessages query message returns a list of all message types that are supported by the RIP or printer JDF gateway.

Resource Query/Command

The resource command message is used to modify or create either global device settings or a running Job. The resource query is used to request, e.g. the list of media or inks from the MIS. This integration has to use both implementations.

SubmitQueueEntry Command

The SubmitQueueEntry command submits a job to a queue of a device or controller, RIP or printer. The QueueSubmissionParams provides the parameters of the submission ReSubmitQueueEntry Command A job is resubmitted to a queue using the ResubmitQueueEntry message. This allows late changes to be made to a job without affecting queue parameters and without exporting the internal structure of a queue. Resubmission overwrites the previously submitted job.

AbortQueueEntry Command

A submitted job can be aborted by the sender with the AbortQueueEntry command. Once this command is issued, the entry specified by QueueEntryDef is aborted and remains in the queue with QueueEntry/@Status="Aborted".

RemoveQueueEntry Command

This command causes the entry specified by QueueEntryDef to be removed from the queue. It does not affect QueueEntry [@Status="Running" or @Status="Suspended"]. Use AbortQueueEntry to stop a running or suspended job and then remove it with RemoveQueueEntry. The RemoveQueueEntry event from the MIS should remove the job from the RIP and the printer queue.

QueueStatus Message

The QueueStatus message request or returns the status of queue.

Subscription

Queries and commands are subscribed for using subscription elements.

Request

The DSF and MIS uses global subscriptions for requesting queue or device status updates. Apart from that, they subscribe on a job level for job status updates Status Signals and Return JDF The RIP provides the following status to the MIS. The information in brackets shows at which the RIP job status this message is sent:

TestRunInProgress (set during job analysis)
Ready (at any stable RIP job state, e.g. previewed, ripped, etc.)
InProgress (while processing, e.g. ripping, printing)
Completed (after job completion, e.g. printed, verified)

FailedTestRun (job processing errors out)
Suspended (job got canceled)
Aborted (job got aborted)

Once the subscription for QueryStatus query is done, the Signals are sent back by the printer JDF.

Device Capabilities

On receiving GetKnownDevices query, the JDF enabled device sends the response back with all the device capabilities it can support.

ReturnQueueEntry Message

The printer returns the audit information once the job was printed successfully. The ReturnQueueEntry message to the RIP is sent every time a print run finished or ended, and the job on the machine side moves from the active print queue into the done queue. At this time, the JDF connector at the machine side sends a ReturnQueueEntry including all the sum up audit information (media and ink consumption, printing time, wastage, good and bad copies) for this particular print run. This is the case within the following scenarios:

The requested number of printouts were completed, e.g. ten of ten requested copies are printed);
  The printer operator changed the number of copies within the UI, e.g. the MIS requested ten copies, the operator changed the number of copies to five and these five copies were printed. This could happen upfront or during the printing; and
  The printer operator hits an E-Stop or cancelled the job differently.
  The printer operator has the ability to move a completed job back into the active print queue and print another number of copies. This could be required for the following reasons:
    To reprint the job because some of the previously printed copies are not in an acceptable shape;
    To finalize the print run and complete the requested number of copies; and
    To restart the previously stopped or cancelled print run.

After the additional print run ends, the ReturnQueueEntry message to the RIP is sent again.

The JDF connector sums up all audit information (media, ink, printing time) for the number of copies within a print run. The number of copies is independent of the requested number of copies. If the ReturnQueueEntry message was sent and the printer operator starts the print run again, the audit information is added and the complete RQE is sent again to the RIP. If the printer operator changes the media on the machine after a job was already printed, a second section in the RQE is added which counts individual media usage and the number of print runs. This accumulation starts from 0.

Use Cases
Simple and Combined Jobs
General

A simple job is based on one content file which is ripped and printed without any variation on the layout. The feature set of the involved software products allows the user to make various changes on the layout to save media or fulfill the product requirements. It is possible to place multiple jobs (known as nesting or layout) or multiple copies of a single job (known as S&R or layout) at one sheet or to split a job to get it printed on multiple sheets (known as tiling). All of these changes have an impact how the accounting parameters can be calculated and transmitted accurately. One goal of the invention is to handle these job types correctly without any manual user interaction and keep all of this specific logic at the places where the combining or adaptation of a particular job happened.

RIP

If the operator at the RIP combines for instance two JDF jobs to one nesting and send this over to the printer for printing. The printer treats this job as a single print job and delivers the job status and the accounting parameters or the nesting job back. The RIP must split these values using the following routine:

While ripping, the file the RIP is counting the droplets for each and every colorant of each individual job.
  The RIP builds a ration of the sum of the droplet count of the individual job for a single colorant and the droplet count of the complete nesting for this colorant. This ratio is stored in the specific job ticket.
  The JDF signals, as with status updates, are communicated to the DSF or MIS for each ganged job separately.
  If the ink usage is communicated back from the printer, the RIP splits each individual colorant by the calculated ratio and use the results as ink usage parameters for the back communication to the DSF or MIS.
  The media usage is calculated simultaneous by using the ratio of the individual job size to the nesting job size.

Printer

If the operator at the printer combines two or more jobs to a layout, the calculation of the media and ink usage for each individual job is similar to the description above. The printer splits the accounting data based on the previously created ration and delivers it separated back to the RIP and MIS. The printer splits these values using the following routine:

During the job detection the printer is counting the droplets for each and every colorant of each individual job.
  The printer builds a ration of the sum of the droplet count of the individual job for a single colorant and the droplet count of the complete layout for this colorant. This ratio is stored in the data base for the individual job.
  The JDF signals, as with status updates, are communicated to the RIP for each ganged job separately.
  After the printing process is completed, the printer splits each individual colorant by the calculated ratio and uses the results as ink usage parameters for the back communication to the RIP and MIS.
  The media usage is calculated simultaneously by using the ratio of the individual job size to the layout job size.

Media Handling
General

Media is a complex attribute in the JDF because a correct definition requires several parameters. There are even different meanings of media within the DSF/MIS, RIP, and at the printer. The MIS uses it as an inventory item. In the RIP, the media is a virtual definition for a calibration set (EPL+ICC profile) and, at the printer side, it is a physical print substrate. To sync up all of these different meanings of media a mapping is needed.

DSF/MIS—RIP

The DSF or MIS submit the media catalog to the RIP via JMF resource commands. At the RIP side, the mapping between the different DSF/MIS media definitions and the available calibration sets is an administrator and setup task.

It is likely that the RIP operator creates multiple calibration sets for one media. They differ in the printing resolution, half toning algorithm, ink set, or black generation setting, and a given media name is often used for distinguishing them within a long list of calibration sets. For this integration, is it mandatory that calibration sets for the same physical media have the same media name within the RIP. Otherwise the media mapping does not work as described above.

To setup the RIP correctly, the RIP needs the DSF or MIS list of media available for specific device types. The device type must be implemented in the queries and commands to differentiate the media, e.g. by formats (Fiery versus VUTEk, for example). The DSF or MIS must send JMF resource commands whenever a media is added, a media definition is changed, or a media is deleted from its database.

All received media must be added to an internal map within the RIP and pushed further to the printer. This map builds the link between the entries in the DSF or MIS media database and the available calibration sets (media types) of the selected printer. Therefore, a manual process is needed in which the RIP operator defines the link between the MIS media and the proper RIP media type. This has to happen during setup of the RIP, but can be redone whenever it is needed. This mapping is used for all RIP output devices from the same type, e.g. GS printer.

While setting up a new output device for which the RIP operator has not created a mapping, the RIP does not poll or request a media catalog from the MIS/DSF. Rather, the media catalog is sent to the RIP by the MIS/DSF. The DSF or MIS sends a JMF command to the RIP whenever the operator adds, changes, or deletes a media definition. The RIP informs the operator with a visual indicator that the media definition is updated. It is the responsibility of the RIP operator to check the update and adapt the media mapping to the new media definition.

While processing, the RIP uses the created map to select the correct calibration set (EPL+ICC profile) based on information from the DSF or MIS. The map defines the link between the DSF or MIS media and the RIP media type. Based on the additional JDF information, such as ink set, resolution (quality) and the half toning algorithm, the requested calibration set is selected and used for the creation of the print data.

It is a common procedure for the RIP operator to review and change the calibration set manually at the beginning of the RIP process. Independently, if the RIP operator uses the requested calibration set or changes it, the audit information inform the DSF and the MIS which media and which ink were used.

The defined size of the media is also taken from the JDF and used within the RIP for layout and processing of the job.
RIP—Printer At the printer side the DSF or MIS, media definitions are added to the machine database. FIG. 4 shows a mapping tool for media. Media definitions are kept in a table (see Table 1 below) table and keeping it in sync with the definition of the media catalog in the MIS and RIP is important. The media definition within the database requires the following parameters:

TABLE 1

Media definition within the printer

| Parameter | Data Type | Values |
| --- | --- | --- |
| Name | Text | <value> |
| Width | Double | <value> |
| Length | Double | <value> |
| Thickness | Double | <value> |
| Cost | Double | <value> |
| Vacumm | Enum | <value> |
| Type | Enum | web |
| | | sheet |
| | | clear web |
| | | clear sheet |
| Shutters | Enum | none |
| | | single |
| | | double |
| | | post |

TABLE 1-continued

Media definition within the printer

| Parameter | Data Type | Values |
| --- | --- | --- |
| Lamps | Enum | low |
| | | medium |
| | | high |
| | | max |
| | | custom |
| Custom_Cure_Intensity | Integer | <value> |

The printer exposes these as custom JDF attributes for the media resources in the DevCaps to the RIP. The RIP displays them in the special tab for showing the settings for the given printer.

Defining the media in the printer database should happen during setup of the printer because, otherwise, only the default definitions are available. During the setup process at the RIP side, the retrieved media information is transferred towards the printer via a JMF command. The printer adds the new media definition automatically to the database after receiving the JDF command. Note that the parameter list for a media definition includes some media and printer specific parameters. The database entry is built without them and the machine operator adds or corrects it while working with it.

If the MIS sends a JMF command to the RIP after the operator at the MIS side added or changed a media definition, the RIP forwards this JMF command to the printer. This command forces an update of the database as described above.

Ink Handling
General

The correct handling of ink is important for the correct back communication of ink usage. One can distinguish between the definition of the ink set, e.g. if the printer should run in CMYK mode or if the additional light inks have to be used too and the definition of the usage of additional colorant, such as white or clear ink.
DSF/MIS—RIP The printer and RIP inform the DSF and MIS about the possible ink sets at the printer within the device capabilities. For GS printers, CMYK and CMYKcmyk ink sets are possible. The printing of white ink is an option. T The MIS defines the ink set for the output production. The RIP processes the job according to this setting. This means that the proper calibration set (EPL+ICC profile) must be used to create the correct RTL file. The MIS uses a description of the inks as specified as part of the print run. For the RIP, it is a requirement that, e.g. black is treated as black and not marked as an inventory number or any other description. At the printer side, the correct definition of the ink, e.g. name, vendor or ID, along with the pure color name, is important. This becomes important if different inks are available and the operator needs to take care to choose the correct ink for the particular print run.
RIP—Printer On the printer side, the RTL file defines the used ink channels so there is no need to distinguish between a CMYK or CMYKcmyk ink set. Even the usage of additional colorants is taken out of the RTL file. Jobs which request an ink set that is not supported error out at the printer side, e.g. a job with white ink is send to the printer without white ink support
Content Handling
DSF/MIS—RIP The DSF and MIS send the link to the content as URL. It is important that the location is accessible from the RIP side.

This is because the RIP server is running as a service and it might be required to set up the user rights correctly to make a download of the content file possible. The RIP should be capable of supporting multiple content files within on JDF.

RIP—Printer

Printing on, for example, a GS printer is a time critical issue. Many processes run in real time. Therefore, it is not possible to interfere these processes with the up- or download of content files. To fulfill this requirement, the RIP writes the content file either at a shared local folder at the RIP workstation, or at a shared network location, and sends the URL within the JDF to the printer. The printer downloads the content whenever it is safe for the printing process.

To avoid a significant delay between the finalization of the ripping at the RIP side and the appearance of the job within the UI, the RIP provides a preview with the JDF ticket. After arriving of the SubmitQueueEntry command, the printer process the JDF and can add the job immediately to the job list in the UI. As long as the content is not downloaded to the printer, the printing of the job is not possible.

Audit Information: Media, Ink Usage, Printing Time

Unit of Measurements

Following are the units of measurements for the different audit information:

Media length: points

Area coverage: square points

Ink: liter

Media Handling

The printer delivers:
1. The printed length (L)
2. The printed square feet (SQF)
3. The number of print runs (PR), e.g. ten copies are needed. The operator placed two per sheet. PR=5, equivalent for roll)
4. Number of copies (N)

For the particular job, it is known if it needs to be printed or roll or sheet media and:
1. Media width (w)
2. Media length for sheet (I) for roll this is the total length of the roll but not needed below.

Here are the different scenarios:
1. Printer runs on sheets. One or multiple copy per sheet.
a. Inventory management: PR defines the number of used sheets.
b. Used media: SQF represents the used media for production
c. Waste: ( ) (size of the sheet multiplied with the number of print runs reduced by the printed square points)
2. Printer runs on roll media. one roll, with or without layout (jobs are located after each other or two or more jobs are located beside each other)
a. Inventory management: L defines the length of used roll media.
b. Used media: SQF represents the used media for production.
c. Waste: ( ) (width of the roll multiplied with the printed length multiplied with the number of print runs reduced by the printed square points).
3. Printer runs on roll media. Multiple rolls (up to three), layout (two or more jobs are located beside each other)
a. Inventory management: L defines the length of used roll media.
b. Used media: SQF represents the used media for production.
c. Waste: ( ) (width of the roll multiplied with the printed length multiplied with the number of rolls multiplied with the number of print runs reduced by the printed square points).

For sheet media, the number of used sheets is reported back. For roll media the media length is reported back in points. In both cases the area coverage is reported back in square points.

If a job has to be reprinted, the ReturnQueueEntry message includes a second ResourceAudit for media and ink usage. The amount of ink and media usage for the second print run sum up the values from the previous print runs.

If the printer operator exchanges the media in-between two print runs, then the counting for the media usage starts from zero again. The ID for the new media is tracked in the ReturnQueueEntry message.

Ink handling

Ink usage is reported back in liters.

Time handling

The printing time is reported back in JDF conform dateTime format

RIP—Printer

The transactions between the RIP and printer are based on the JMF standard. The most relevant JMF commands and queries that need to be implemented by printer are defined above with examples of Requests and Responses. There are many more JMF messages as per the JDF specifications.

MIS Job Ticket

The DSF and MIS include a hyperlink (URL) to the JDF job ticket. The RIP and the printer user interface display this link within the job information. The operator could open up the job ticket in a Web browser to get additional information about the current job. For all MIS's that do not support a Web-based interface, this URL could point to a job ticket within a PDF format. The RIP or the printer operator opens it to get the complete overview about additional settings at the MIS side.

Print Ready Job Creation

Another use case is the creation of a print ready job within the DSF, MIS, and RIP software products to avoid any additional user interaction from the print operator at the machine apart from the pure printing task.

Multi Layer Definition

At the UI it is possible to arrange different jobs in such a way to print them above each other with the ability to add a black or a white layer in between. This feature is mainly used to print on transparent media. To define the order but even the content of each individual print run we use the JDF technique of defining product parts separately.

Multi Roll Setup

The GS5000 printer, for example, prints on two or more media rolls at the same time. Therefore, the operator at the UI must arrange the jobs correctly so that the placement of the job fits with the media position.

Print Options

The VUTEK GS printer, for example, sends special print options within the device capabilities to the RIP. The RIP client displays them within the printer special tab. The RIP operator can make settings here and the created JDF ticket transfers them to the printer.

Table 2 lists some print options. These parameters are important in an automated workflow environment in which the job arrive print ready at the printer and no manual interactions of the print operator are required.

TABLE 2

Print Options

| Parameter | Prerequisites | Comments |
|---|---|---|
| Printing Mode | Values:<br>Bidirectional<br>Unidirectional | Bidirectional: Prints while carriage moves in both directions<br>Unidirectional: Prints while carriage moves from right to left |
| Interlace Mode | Values:<br>Multipass Standard<br>Single Pass Standard<br>Multipass High<br>Multipass Double Strike<br>Multipass Ultra High | Multipass Standard: Standard interlacing levels.<br>Single Pass Standard: ½ the interlacing levels as Multipass Standard.<br>Multipass High: 2X the interlacing levels as Multipass Standard.<br>Multipass Double Strike: 2X the data levels as Multipass Standard.<br>Multipass Ultra High: 3X the interlacing levels as Multipass Standard. |
| Carriage Speed | Values:<br>Standard<br>Max | Speed at which Carriage travels while printing.<br>Standard: 62 inches/second (52 inches/second for high-res)<br>Max: Maximum speed (62 inches/second). |
| Smoothing | Values:<br>None<br>Light<br>Heavy | Each smoothing level will increase the amount of interlacing, producing higher quality print from lowest to highest |
| Curing | Values:<br>Low<br>Medium<br>High<br>Max<br>Custom | % of Lamp Power to be used on curing:<br>Low: 40%<br>Medium: 60%<br>High: 80%<br>Max: 100%<br>Custom: User defined % |
| Shutter Mode | Values:<br>Single<br>Double<br>Post | Single: Trailing Lamp shutter will open following each pass<br>Double: Both Lamp shutters will open on each pass<br>Post: First Lamp shutter will open on each pass curing the previous pass |
| Full Bleed | Binary state | Bleeds the image over the edge of the media |
| Add Header | Binary state | Adds header information as defined in VUI |
| Add Footer | Binary state | Adds footer information as defined in VUI |
| Center | Binary state | Centers the image on the media |
| Mirror | Binary state | Mirrors the image. The image prints from right offset (rather than the left on a regular print), then flips the image |

Dashboard and Notification Support

Figure 5:
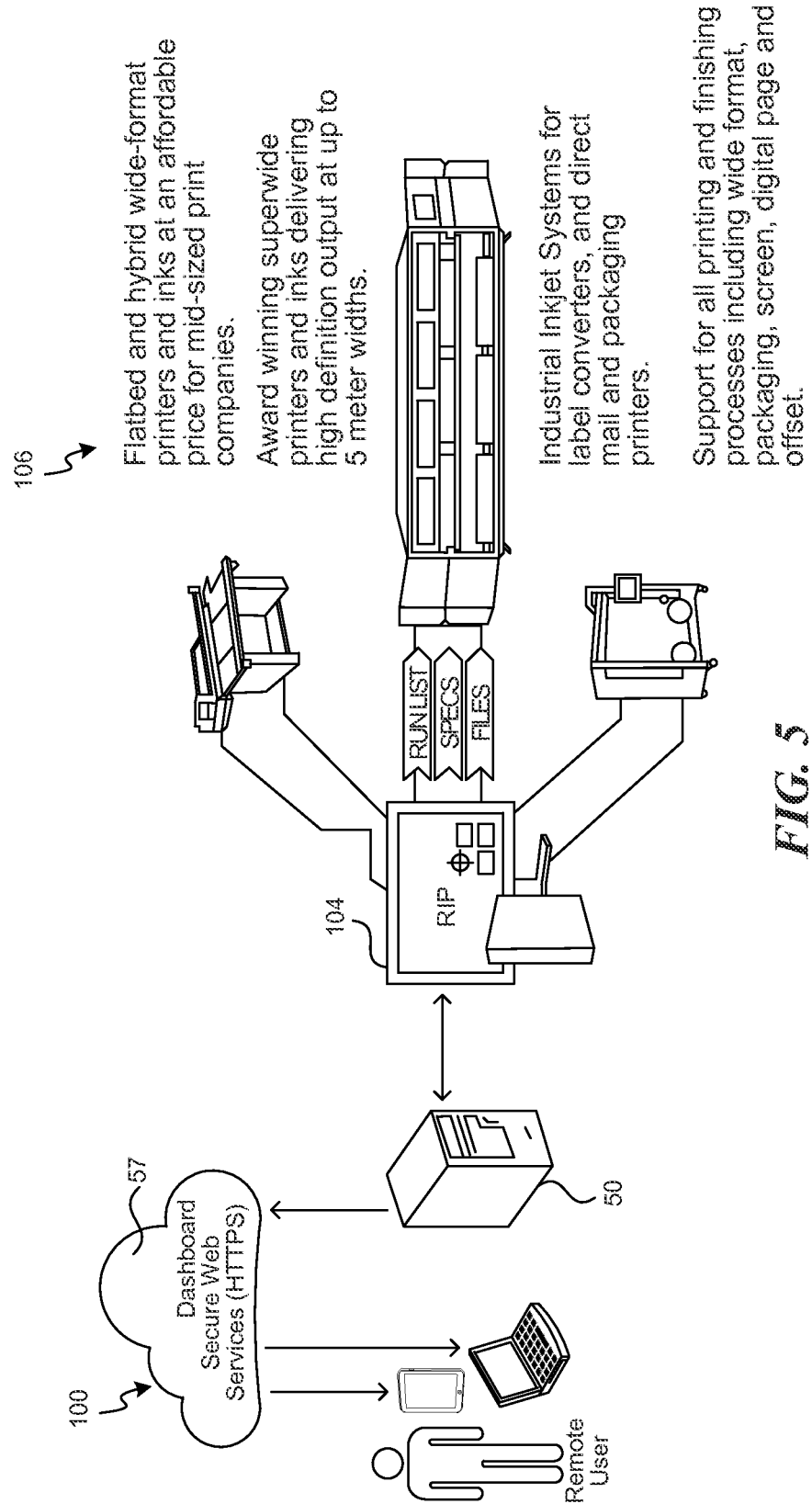
FIG. 5 is a block schematic diagram that shows a system architecture that supports a dashboard and notification services according to the invention.

In an embodiment of the invention, the RIP herein can be thought of as a server that can drive many inkjet printers from different vendors. Hence, the RIP can be used as a centralized provider of a dashboard and notifications for all the printers that are connected to it. In an embodiment of the invention, there may be multiple RIP servers in a print shop driving multiple printers and/or proofers. FIG. 5 is a block schematic diagram that shows a system architecture that supports a dashboard and notification services according to the invention. In FIG. 5, the acquisition function 100 communicates with the RIP 104 via a dashboard agent 50. The RIP, in turn communicates with the production function 106 (see, also, FIG. 1).

Notifications Setup Workflow

Registration, installation, and configuration of the dashboard and notifications function should be seamless for a RIP administrator. In the presently preferred embodiment of the invention there are two scenarios of interest (see FIGS. 6-8):

A customer, who has a RIP driving two or more printers, just bought a dashboard license. How can notifications be set up for the printers from RIP easily, i.e. without having to go to different machines/web sites; and A customer, who already has a dashboard license, wants to set up notifications for a new printer in the RIP.

Figure 6:
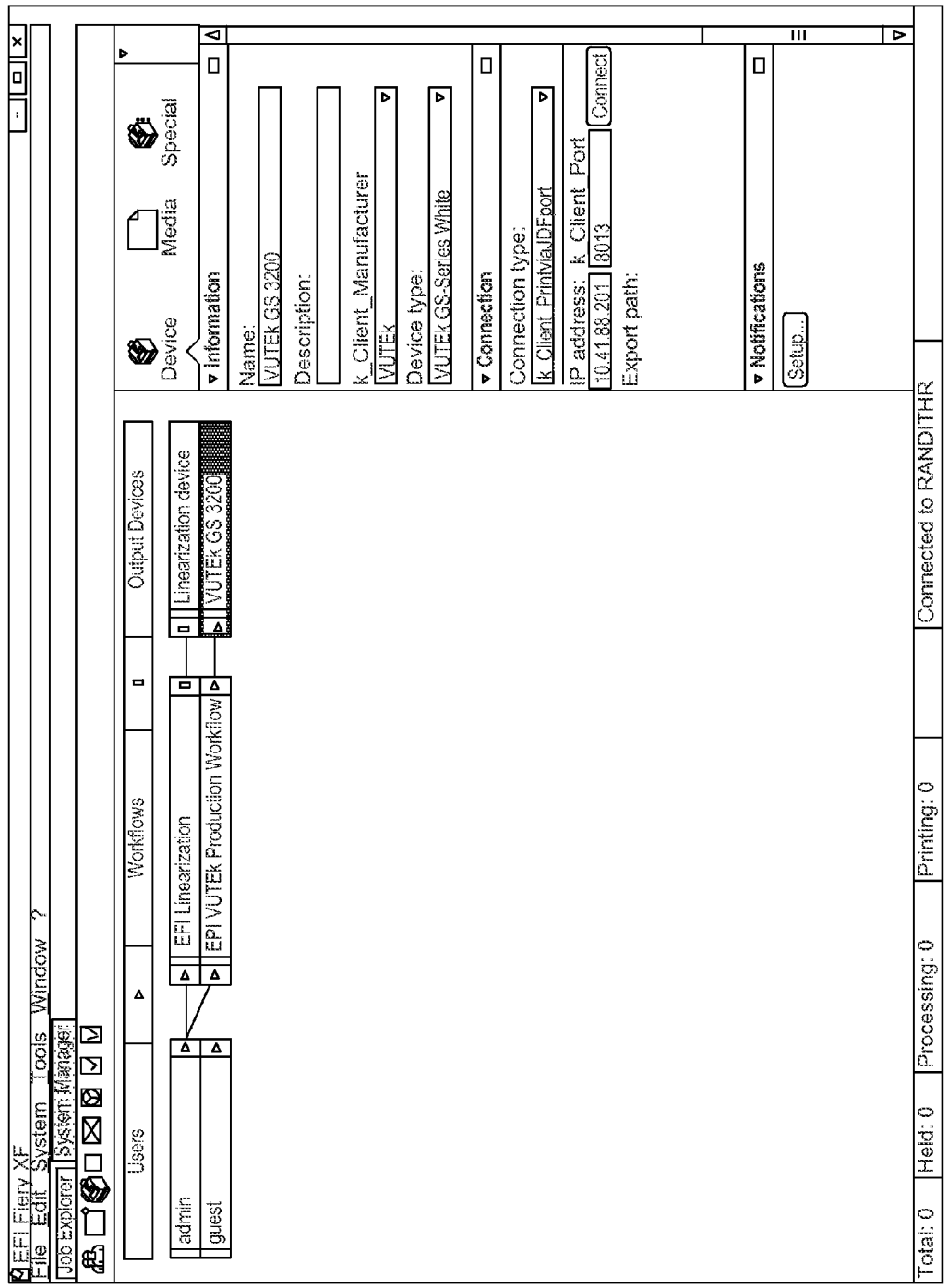
FIG. 6 is a screen shot showing a dialog for printer setup in a RIP according to the invention.

FIG. 6 is a screen shot showing a dialog for printer setup in a RIP according to the invention.

Figure 7:
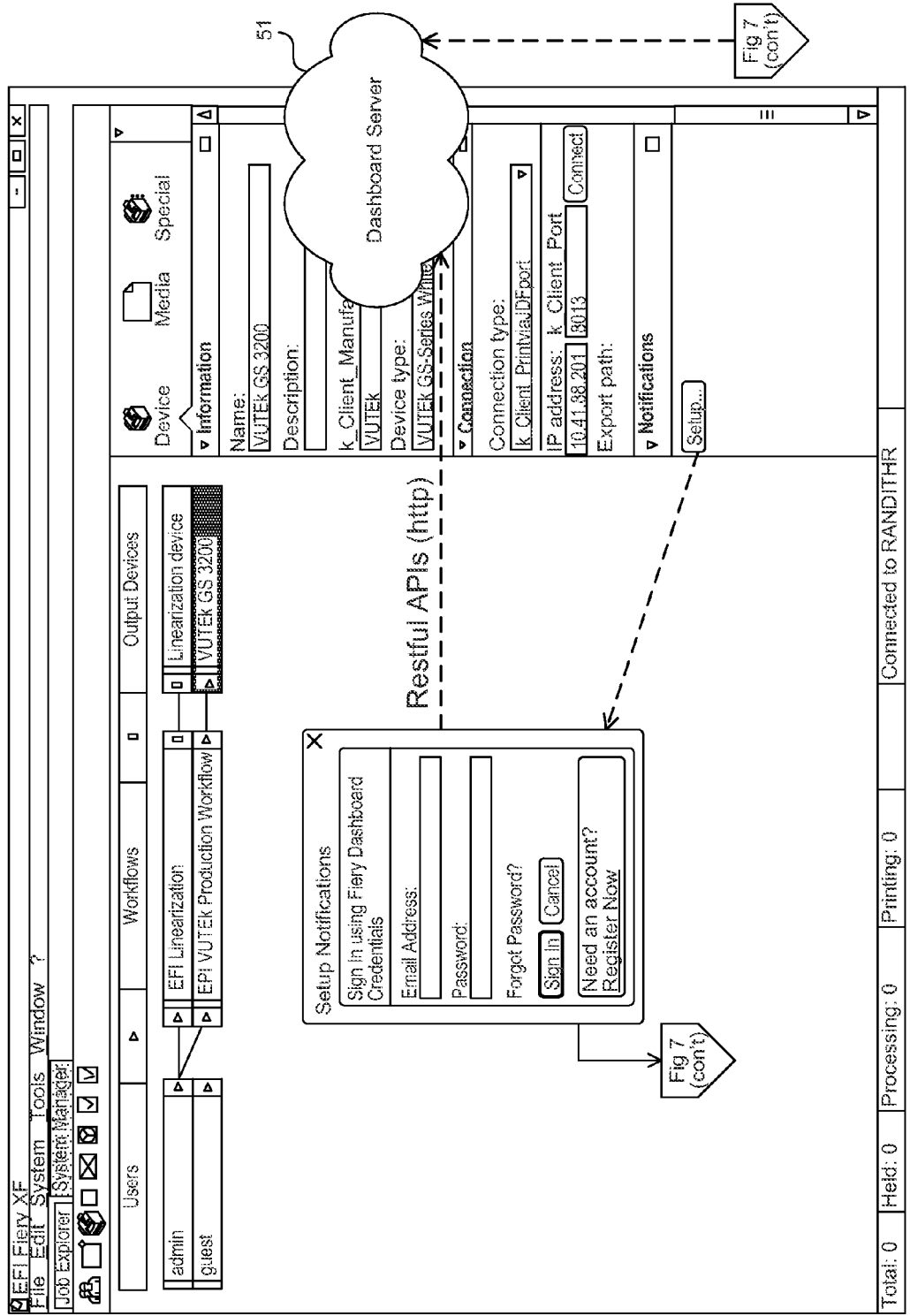
FIG. 7 is a screen shot showing a first step in dashboard registration, agent installation and notifications setup according to the invention.

FIG. 7 is a screen shot showing a first step in dashboard registration, agent installation and notifications setup according to the invention. FIG. 7 shows the first scenario above, where the customer has just purchased a dashboard license.

Figure 8:
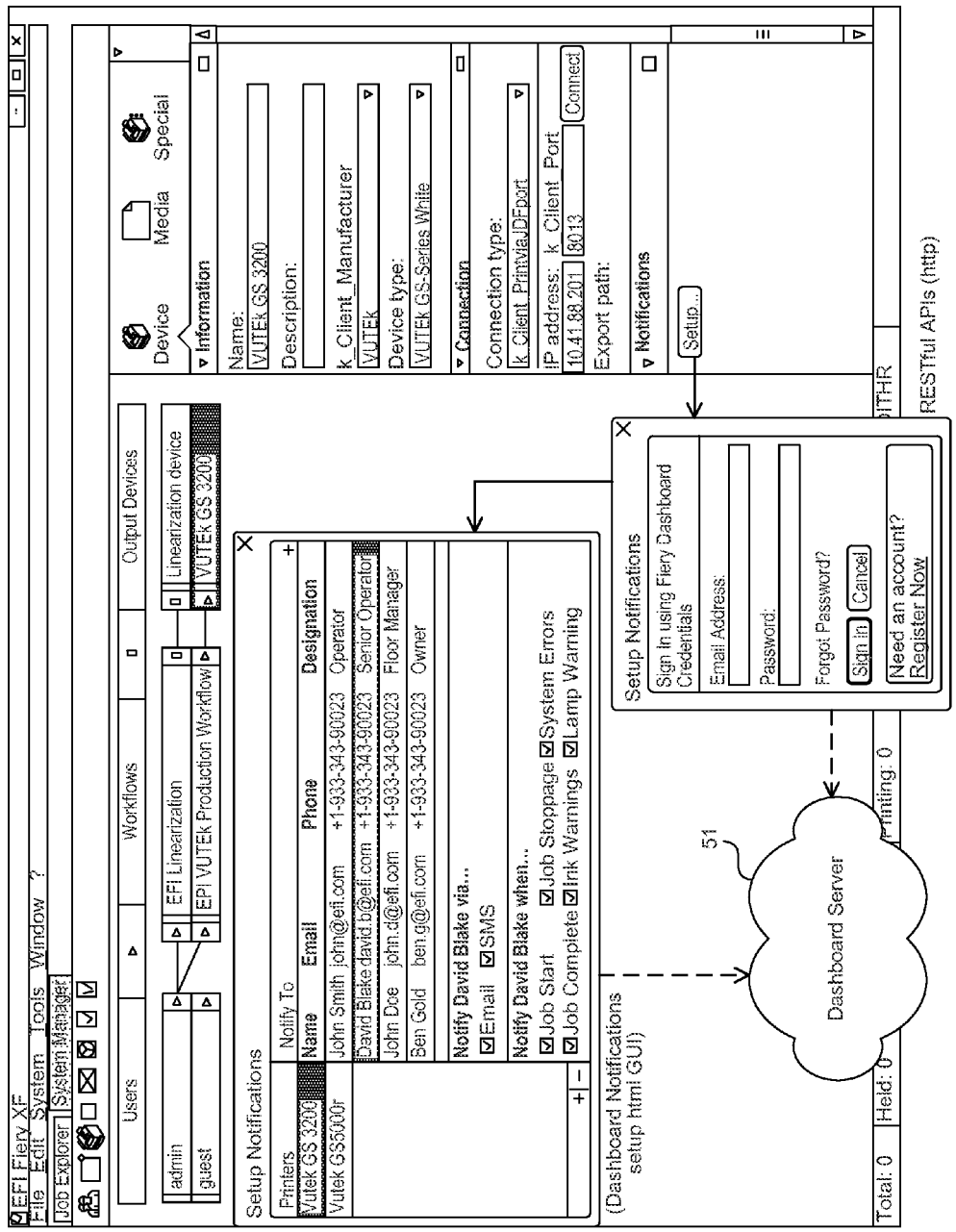
FIG. 8 is a screen shot showing notifications setup where a dashboard license has already been purchased and installed according to the invention.

FIG. 8 is a screen shot showing notifications setup where a dashboard license has already been purchased and installed according to the invention. Thus, FIG. 8 shows the second scenario above, where the customer has just already purchased and installed a dashboard license and want to set up notifications.

Figure 9:
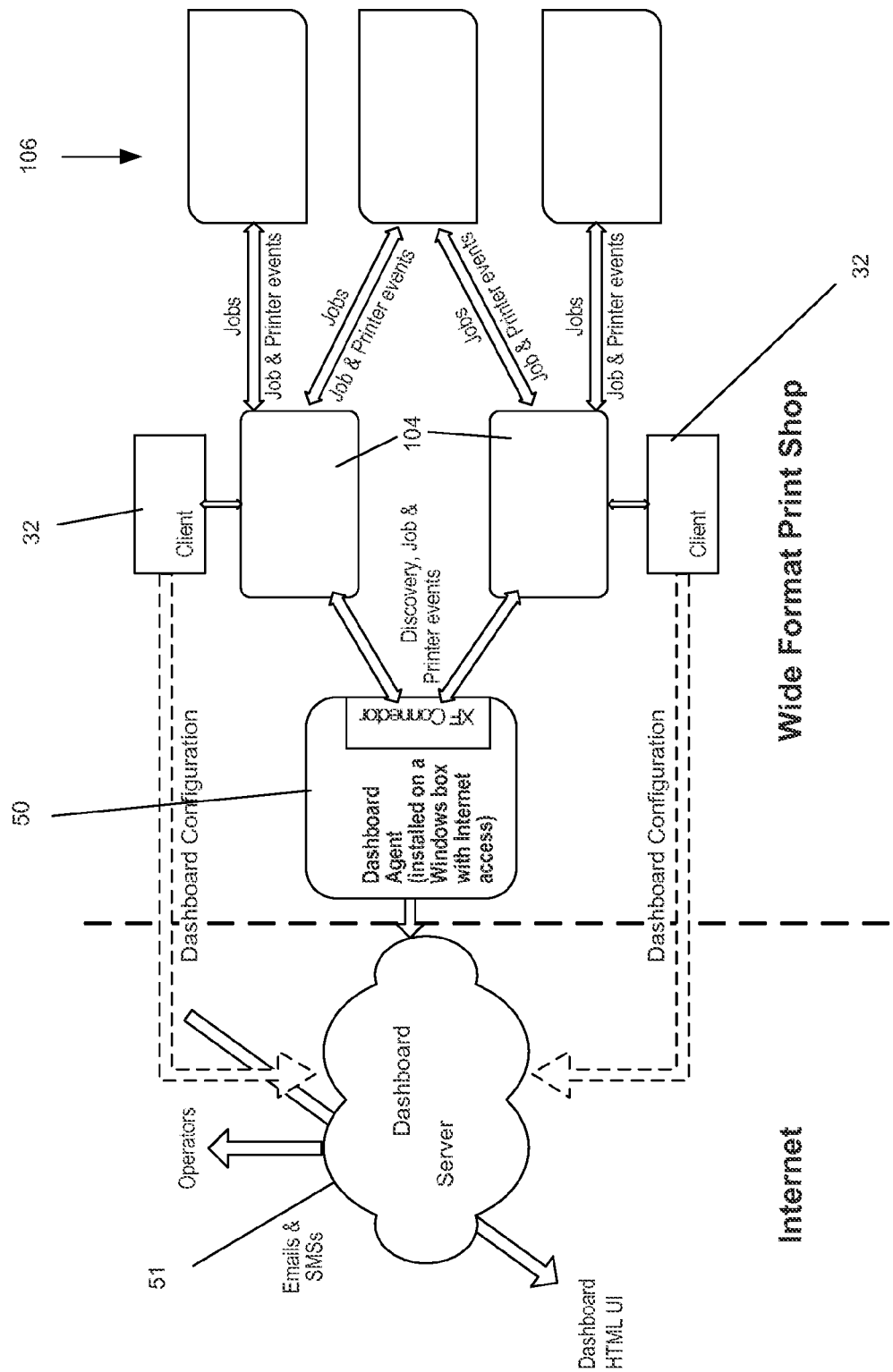
FIG. 9 is a block schematic diagram showing a dashboard and notifications workflow according to the invention.
Figure 10:
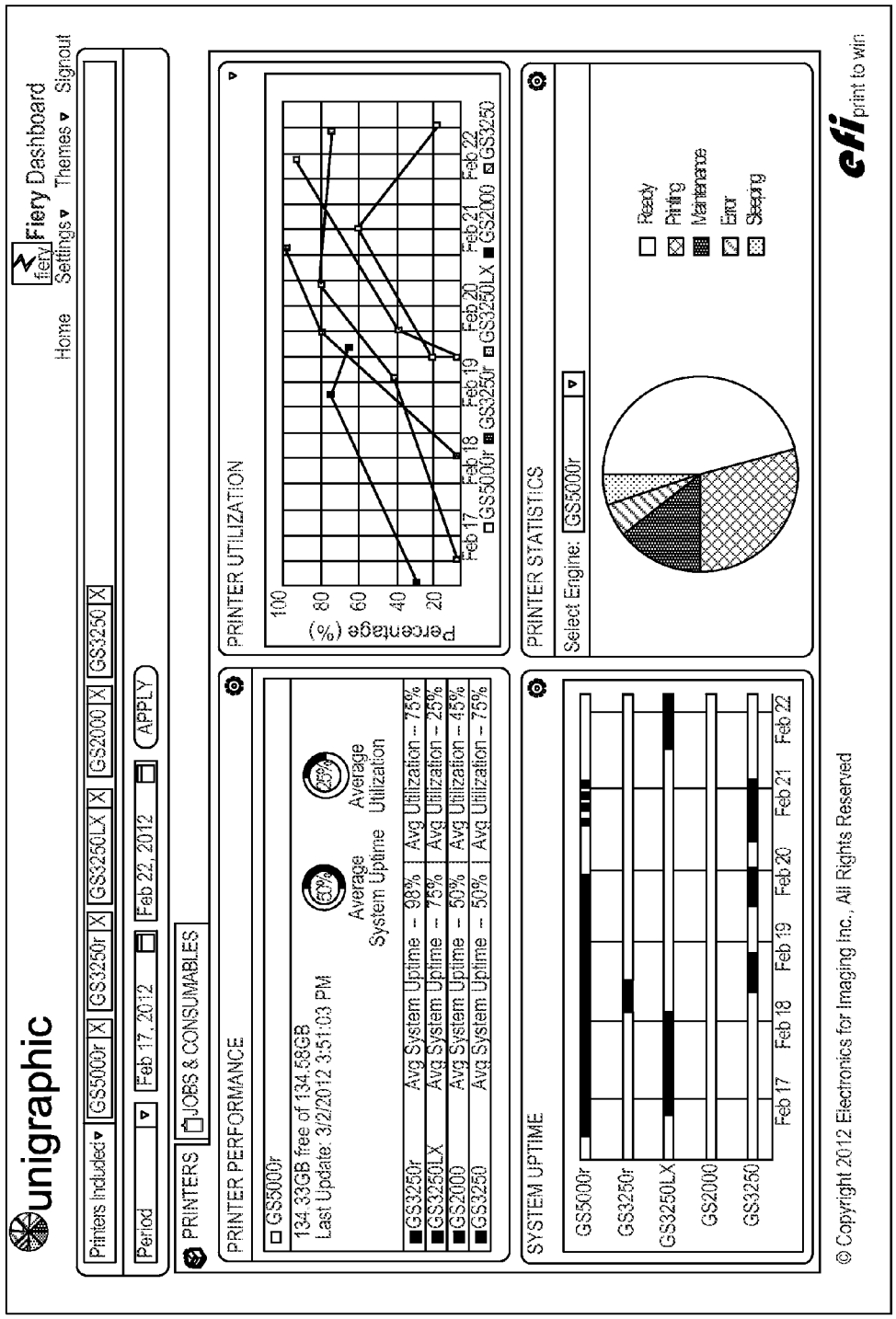
FIGS. 10-14 show a dashboard user interface according to the invention.
Figure 11:
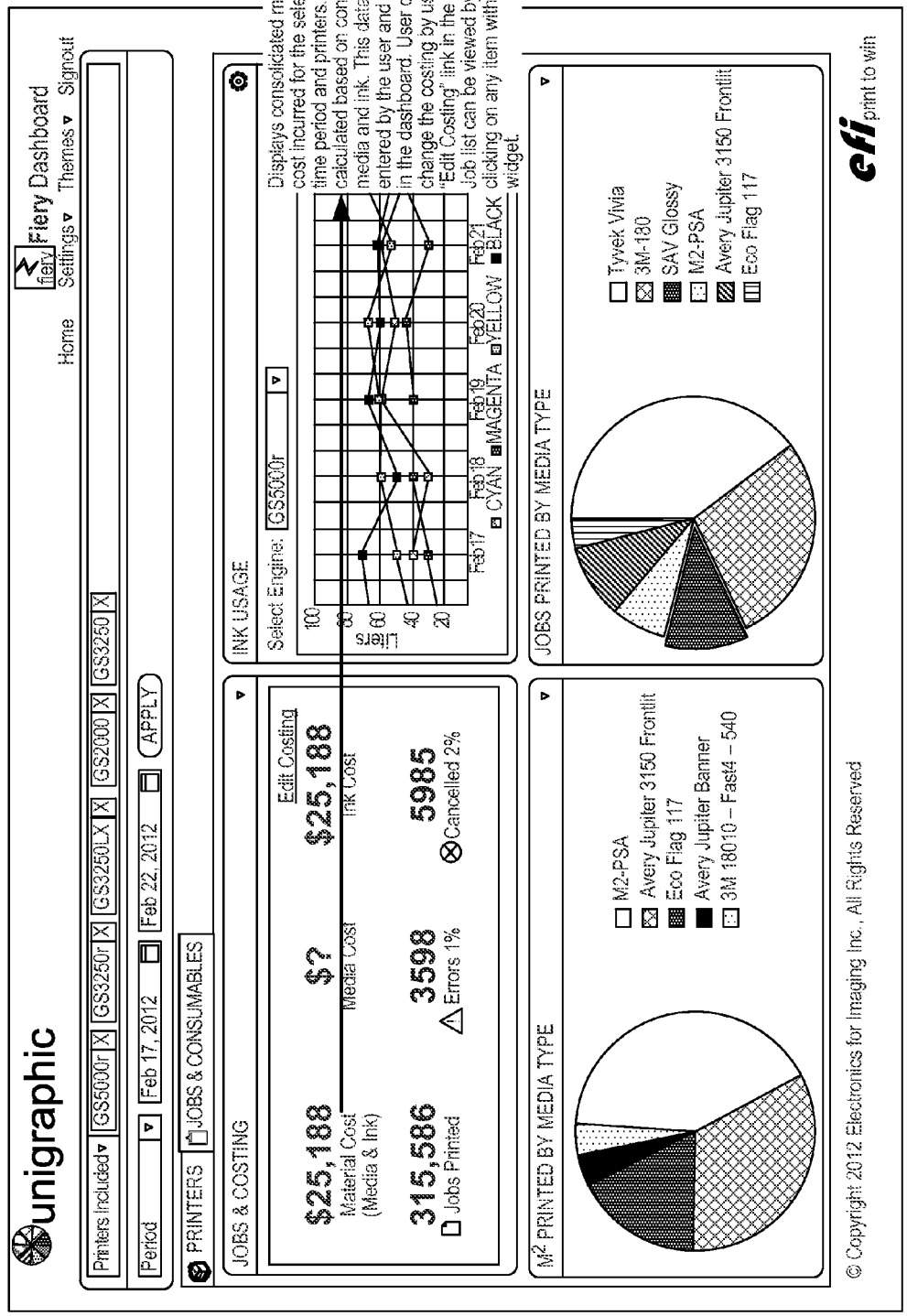
Figure 12:
Figure 13:
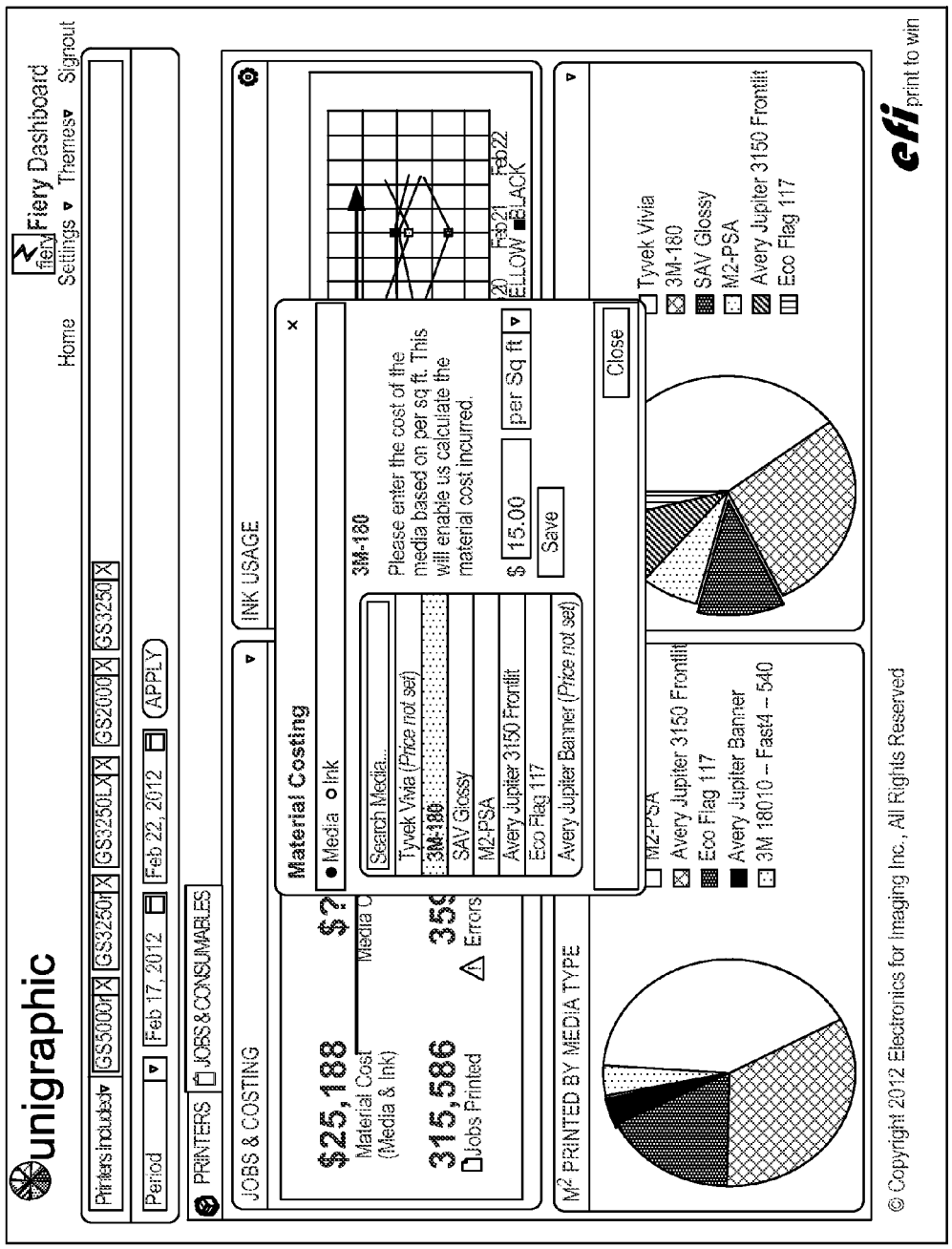
Figure 14:
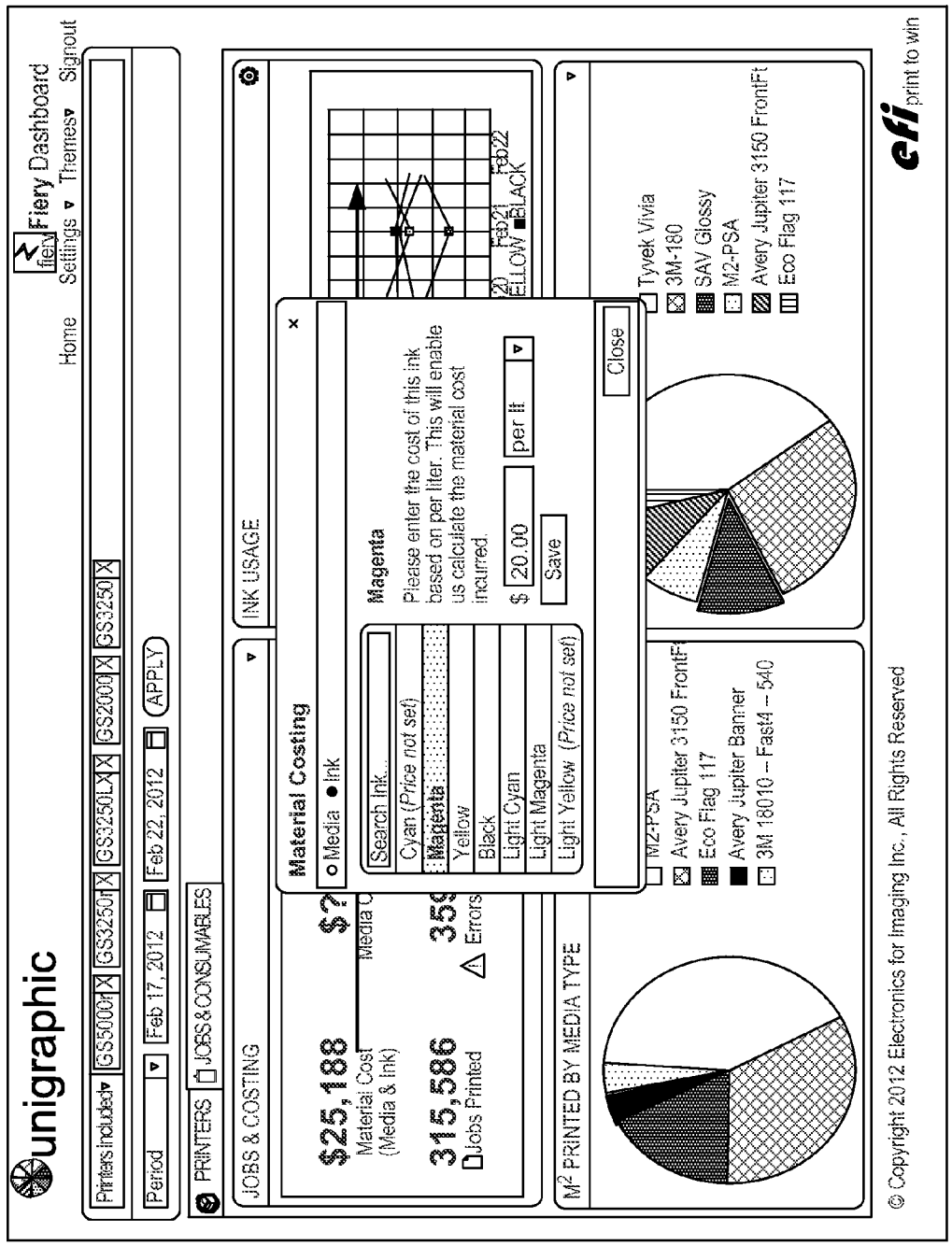

FIG. 9 is a block schematic diagram showing a dashboard and notifications workflow according to the invention. In FIG. 9, the dashboard server 51 is shown interfacing operators and a dashboard HTML user interface to the dashboard agent 50 which, in turn, is in communication with one or more RIPs 104 via the RIP client 32.

One requirement for supporting dashboard and notifications is that the RIP should have bi-directional communication with the printers. Notifications, such as emails and SMSs are only sent via the dashboard. The dashboard server uses a notifications server for email and SMS delivery. Notifications are generated for each printer that is in communication with the RIP.

Notifications are job-centric. In an embodiment of the invention, printer failures and warnings are piggybacked to job status notifications. For example, a notifications might be provided as follows:

"Printing of Job ABC failed on VUTEk GS 3250 due to the overheated lamps"

or:

"Printed Job XYZ successfully on VUTEk GS 5000r. Magenta Ink level is low, please refill."

This approach ensures that customers do not receive too many printer failure and warning alerts when the printer is not actually printing a job.

Dashboard User Interface

FIGS. 10-14 show a dashboard user interface according to the invention. In embodiments of the invention, the dashboard shows printer related data, such as performance, utilization, and statistics (see FIG. 10); job and consumable related data, such as jobs and costing, ink usage, area printed by media type, and jobs printed by media type (see FIG. 11, in which the dashboard displays consolidated material cost incurred for the selected time period and printers, where cost is calculated based on consumed media and ink, and where such data is entered by the user and stored in the dashboard; in this example, the user can change the costing by using the "Edit Costing" link in the dashboard and the job list can be viewed by clicking on any item within the dashboard); jobs (see FIG. 12); and material costs (see FIGS. 13 and 14).

Computer Implementation

Figure 15:
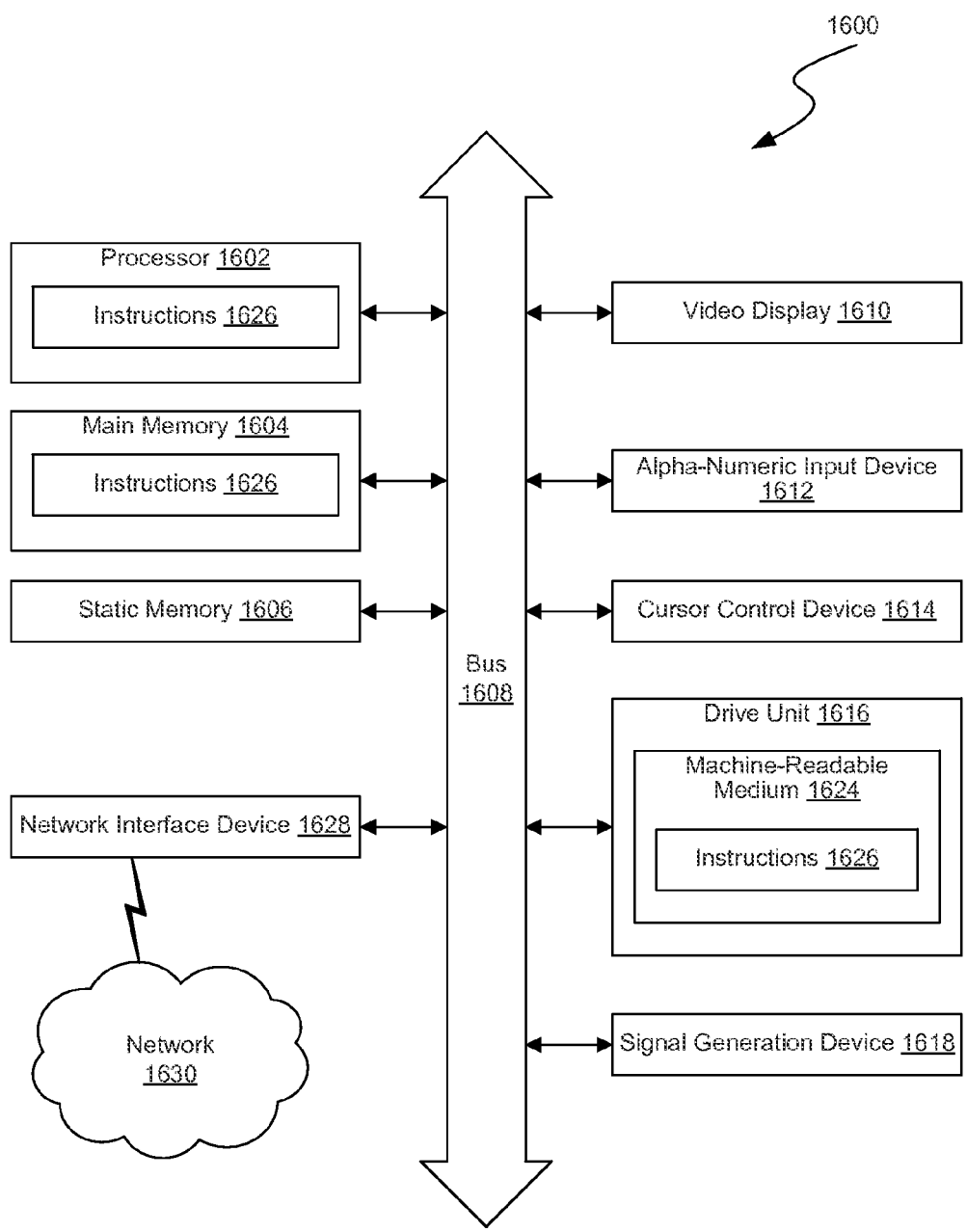
FIG. 15 is a block schematic diagram that depicts a machine in the exemplary form of a computer system within which a set of instructions for causing the machine to perform any of the herein disclosed methodologies may be executed.

FIG. 15 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. For example, a person skilled of the art would appreciate that the printer may be configured to send status messages directly to the planning and scheduling system, the management information system (MIS), and/or the digital store front (DSF) directly, rather than, or in addition to, sending messages to the RIP. For further example, a person skilled in the art would appreciate that there are at least two different cases of applying changes to a print job after the print job is submitted, i.e. the print job is updated, but remains at the state which it reached, e.g. the number of copies is changed; and the print job is to be rerouted, which requires removing the print job from the current position and resubmitting it either with different parameters, such as a new calibration set, or even sending it to another RIP or printer if the current RIP or printer is busy or not available.

Accordingly, the invention should only be limited by the Claims included below.

The invention claimed is:

1. A printing workflow system, comprising:
a raster image processor (RIP) comprising a hub for establishing and maintaining communication, via messages having a common format, of multiple combinations of printer specific parameters between a planning and scheduling system and a plurality of printers lacking active monitoring and management functions, each of the plurality of printers associated with a printer interface comprising a printer adapter that establishes such active monitoring and management functions, said printer adapter configured to actively send messages to said RIP in the common format and translate messages received from the RIP from the common format into a printer specific machine language;

wherein messages received from said plurality of printers announce features and options available at said plurality printers to said RIP, and wherein said RIP, actively announces the received features and options of said plurality of printers to said planning and scheduling system, and wherein the announced features and options available at said plurality of printers are presented via a user interface at said planning and scheduling system;

wherein options selected, via said user interface at said planning and scheduling system, are sent to a particular printer of said plurality printers, via said RIP, with a print job as printer specific job parameters, wherein said particular printer is assigned by said planning and scheduling system to execute the print job based on the announced features available at said particular printer, the print job sent in the common format; and wherein a limitation of said particular printer is known in advance and only printing options that are available at said particular printer can be selected in jobs sent to said particular printer.

2. The system of claim 1, further comprising:
a processor implementing a digital store (DSF) front comprising a management facility for receiving requests for quotes (RFQ), specifications (SPECS), files; and for providing payment and reorder information, catalog information, pricing, status, and invoices.

3. The system of claim 1, further comprising:
a processor implementing a management information system (MIS) for providing job and system management, planning, reporting, and scheduling;
wherein said MIS provides schedule and job information, specifications, and files to a preparation function and receives status and cost information from said preparation function.

4. The system of claim 1, further comprising:
a processor implementing a preparation function, interacting with said management function, for providing proofing and photo work and advanced workflow, automated preflight, RIP, and color management functions;
said preparation function providing one or more job tickets for use in connection with a production function for providing schedule and job information, specifications, and files to said production function and for receiving status and cost information therefrom.

5. The system of claim 1, further comprising:
said management function, responsive to a user, defining and identifying full media parameter configurations.

6. The system of claim 1, further comprising:
said management function, responsive to a user, associating a particular price to a particular print option, product, or product quality.

7. The system of claim 1, further comprising:
said management function, responsive to a user, configuring a pricing schema wherein different prices are provided for, and are related to, a particular selected output quality.

8. The system of claim 1, wherein said common message format comprises CIP4 JDF.

9. The system of claim 1, said printer adapter comprising:
a receiver for receiving messages or notifications from registered senders;
an interpreter for interpreting a message or notification;
a translator for translating said messages or notifications from a communication language in said common format into a printer machine language; and
an active handler for modifying a printer database to create an internal event at said printer, and for sending messages to a printer UI or connected applications.

10. The system of claim 9, said printer adapter actively sending messages or notifications from said particular printer for events that include any of a new job arrived (received successful or failed); a job starts printing; print progress updates; a job is printed, including accounting parameters; a job is canceled, including accounting parameters; an error occurred while printing; and a job is deleted from an active workspace.

11. The system of claim 9, said printer adapter communicating printer status information to said RIP including any of printing, idle, on maintenance, and purging.

12. The system of claim 1, said planning and scheduling system receiving messages or update information and updating a corresponding production plan accordingly;
wherein any new print job which arrives at said planning and scheduling system is scheduled and assigned to a printer that best matches requirements of said print job; and
wherein a print job is added to a workspace to fulfill different rules for optimizing a production process, wherein said rules are related to a particular production planning and scheduling system or to an individual setting.

13. The system of claim 1, wherein any change in said print job creates an event which actively sends update messages via said RIP to said particular printer;
wherein a workspace of active print jobs at said particular printer shows job order to represent a production order of said planning and scheduling system.

14. The system of claim 1, said messages comprising one or more events that include any of information that a new job is ready for printing, which creates an action on said particular printer that adds a job to a defined place in a print job workspace; information that an order has to be changed, which creates an action on said particular printer to rearrange a job order in said print job workspace; and information that a job has to be removed, which creates an action on said particular printer that a particular job is deleted from said print job workspace.

15. The system of claim 1, wherein upon receiving information about a printer change from the planning and scheduling system, said RIP sends a request for removing a job to a printer currently responsible for said, determines if a new processing of the job is required for a printer to which the job is to be moved, prepares new print data for the job if required, and sends the new or the original print data to the printer to which the job is to be moved; wherein the job is added at a requested position to a workspace of active print jobs at the printer to which the job is to be moved.

16. The system of claim 1, further comprising:
multiple RIP systems in cooperating communication for moving print jobs from a printer which is currently heavily used to a printer which is idle or which can offer a slot for production soon.

17. The system of claim 1, said printer adapter comprising:
an http based JMF interface exposed by a printer control system.

18. The system of claim 1, comprising:
a digital store front (DSF) communicating with a management information system (MIS) for retrieving print capabilities of the RIP and the plurality of printers, sending and responding to commands and queries, and sending a ticket for a created job in the DSF via a command.

19. The system of claim 1, comprising:
a management information system (MIS) sending to a digital store front (DSF) signals to a subscription URL specified by the MIS and signals to update job status;
said MIS communicating via an MIS connect interface with an interface of the RIP for retrieving print capabilities of a printer configured in the RIP; publishing an MIS media list to the RIP; sending signals to a subscription for commands; and sending commands and queries.

20. The system of claim 1, comprising:
said RIP sending to a management information system (MIS) print capabilities to publish supported options of said plurality of printers, sending signals to a subscription URL specified by the MIS; sending signals to update job status and device status; and sending accounting information comprising any of media and ink usage and printing and processing time;
said RIP communicating via said printer interface of each of the plurality of printers for retrieving capabilities of the plurality of printers, pushing an MIS media list forward to the plurality of printers, and sending JMF commands and queries;
said plurality of printers sending to the RIP print capabilities to publish supported options of said plurality of printers, sending signals to a subscription URL specified by the RIP, sending signals to update job status and device status, and sending accounting information comprising any of media and ink usage and printing and processing time; and
said RIP downloading content files for a given job from a URL sent from the MIS or from a digital store front (DSF); wherein a printer assigned said given job downloads said content files for said given job from a URL sent from the RIP.

21. A printing method, comprising:
providing a raster image processor (RIP) comprising a hub for establishing and maintaining communication, via a message having a common format, of multiple combinations of printer specific parameters between a planning and scheduling system and a plurality of printers lacking active monitoring and management functions, each of the plurality of printers associated with a printer interface comprising a printer adapter that establishes active monitoring and management functions, said printer adapter configured to actively send messages to said RIP in the common format and translate messages received from the RIP from the common format into a printer specific machine language;
wherein messages received from said plurality of printers announce features and options available at said plurality of printers to said RIP, and wherein said RIP, actively announces the received features and options of said plurality of printers to said planning and scheduling system, and wherein the announced features and options available at said plurality of printers are presented via a user interface at said planning and scheduling system;
wherein options selected, via said user interface, at said planning and scheduling system are sent to a particular printer of said plurality of printers, via said RIP, as printer specific job parameters along with or subsequent to sending a print job, wherein said particular printer is assigned by said planning and scheduling system to execute the print job based on the announced features available at said particular printer, the print job sent in the common format; and
wherein said particular printer's limitations are known in advance and only printing options that are available at said particular printer can be selected in jobs sent to said particular printer.

22. A printer adapter for establishing active monitoring and management functions for a printer otherwise lacking such active monitoring and management functions, comprising:
a receiver for receiving messages or notifications, in a common format, from registered senders via a raster image processor (RIP) comprising a hub for establishing and maintaining communication, via messages having the common format, of multiple combinations of printer specific parameters between any of a digital store front and a planning and scheduling system and said printer adapter;
an interpreter for interpreting said received messages or notifications, wherein said received messages and notifications include printer specific job parameters sent along with or subsequent to a print job, said printer specific parameters based on options selected, via a user interface, at any of said RIP, said digital store front, or said planning and scheduling system;
a translator for translating said messages or notifications from a communication language in said common format into a printer machine language;
an active handler for modifying a printer database to create an internal event at said printer, and for sending messages to a printer UI or connected applications; and
a sender for actively sending messages in the common format that announce features and options available at said printer to any of said digital store front and said planning and scheduling system, via said RIP, wherein the announced options available at said printer are presented via said user interface, and wherein the announced features are used by said planning and scheduling system to assign said print job to said printer, via said RIP.

23. A printing workflow system, comprising:
a raster image processor (RIP) comprising a hub for establishing and maintaining communication, via a message having a common format, of multiple combinations of printer specific parameters between:
a digital store front (DSF) comprising a management facility for receiving requests for quotes (RFQ), specifications (SPECS), files; and for providing payment and reorder information, catalog information, pricing, status, and invoices; and
a plurality of printers lacking active monitoring and management functions, each of the plurality of printers associated with a printer interface comprising a printer adapter that establishes such active monitoring and management functions, said printer adapter configured to actively send messages to said RIP in the common format and translate messages received from the RIP from the common format into a printer specific machine language;
wherein messages received from said plurality of printers announce features and options available at said plurality of printers to said RIP, wherein said RIP, actively announces the received features and options of said plurality of printers to said DSF, and wherein the announced features and options available at said plurality of printers are presented via a user interface at said DSF;
wherein options selected, via said user interface, at said DSF are sent to a particular printer of said plurality of printers, via said RIP, along with or subsequent to sending a print job as printer specific job parameters, wherein said particular printer is assigned to execute the print job based on the announced features available at said particular printer, the print job sent in the common format; and wherein said particular printer's limitations are known in advance and only printing options that are available at said particular printer can be selected in jobs sent to said particular printer, via said RIP.

24. The printing workflow system of claim 23, wherein said printer specific parameters provided subsequent to sending a print job to said particular printer effect any of updating said print job while said print job remains at a present state at said particular printer; and rerouting said print job by removing said print job from a current position and resubmitting said print job either with different parameters or sending said print job to another RIP or printer if a current RIP or printer is busy or not available.

25. A printer adapter for establishing active monitoring and management functions for a printer otherwise lacking such active monitoring and management functions, comprising:
- a receiver for receiving messages or notifications, in a common format, from registered senders via a raster image processor (RIP) comprising a hub for establishing and maintaining communication, via a message having the common format, of multiple combinations of printer specific parameters between any of a digital store front and a planning and scheduling system and said printer adapter;
- an interpreter for interpreting said received messages or notifications, wherein said received messages and notifications include printer specific job parameters sent along with or subsequent to a print job, said printer specific parameters based on options selected, via a user interface at any of said digital store front and said planning and scheduling system;
- a translator for translating said messages or notifications from a communication language in said common format into a printer machine language;
- an active handler for modifying a printer database to create an internal event at said printer, and for sending messages to a printer UI or connected applications; and
- a sender for actively sending messages in the common format that announce features and options available at said printer to any of said digital store front and said planning and scheduling system, via said RIP, wherein the announced options available at said printer are presented via said user interface, and wherein the announced features are used by said planning and scheduling system to assign said print job to said printer, via said RIP.

26. A printing workflow system, comprising:
- a raster image processor (RIP) comprising a hub for establishing and maintaining communication, via a message having a common format, of multiple combinations of printer specific parameters between any of a digital store front (DSF) and a planning and scheduling system, and a plurality of printers lacking active monitoring and management functions, each of the plurality of printers associated with a printer interface comprising a printer adapter that establishes such active monitoring and management functions, said printer adapter configured to actively send messages to said RIP in the common format and translate messages received from the RIP from the common format into a printer specific machine language;
- wherein messages received from said plurality of printers announce features and options available at said plurality of printers to said RIP, wherein said RIP, actively announces the received features and options of said plurality of printers to said DSF and said planning and scheduling system, and wherein the announced features and options available at said plurality of printers are presented via a user interface at said DSF;
- wherein options selected, via said user interface, at said DSF are sent by said planning and scheduling system to a particular printer of said plurality of printers, via said RIP, with a print job as printer specific job parameters, wherein said particular printer is assigned by said planning and scheduling system to execute the print job based on the announced features available at said particular printer, the print job sent in the common format;
- wherein a limitation of said particular printer is known in advance and only printing options that are available at said particular printer can be selected in jobs sent to said particular printer; and
- a dashboard and notifications server for interfacing operators and a dashboard user interface to a dashboard agent which, in turn, is in communication with said RIP;
- said dashboard and notifications server comprising a centralized provider of a dashboard and notifications for all printers associated with said printing workflow system.

27. The system of claim 26, said dashboard user interface providing any of printer related data, including any of performance, utilization, and statistics; job and consumable related data, including any of jobs and costing, ink usage, area printed by media type, and jobs printed by media type; jobs; and material costs.

* * * * *